US005664947A

United States Patent [19]
Dietterich et al.

[11] Patent Number: 5,664,947
[45] Date of Patent: Sep. 9, 1997

[54] METHOD, APPARATUS, AND KIT FOR MARKING A SURFACE WITH COLORED BUBBLES

[75] Inventors: Charles W. Dietterich, Brodheadsville, Pa.; Kalvin K. Klundt, LaGrange, Ky.; Gordon R. Perry, New York; Jude C. Tan, South Ozone Park, both of N.Y.

[73] Assignee: Binney & Smith Inc., Easton, Pa.

[21] Appl. No.: 386,378

[22] Filed: Feb. 10, 1995

[51] Int. Cl.$^6$ .......................... G09B 11/10; A63H 33/28
[52] U.S. Cl. .................................. 434/84; 446/15
[58] Field of Search ................... 434/84, 81; 446/15–21, 446/267; 273/58 H, 418

[56] References Cited

U.S. PATENT DOCUMENTS

| D. 306,465 | 3/1990 | Klundt ........................ D21/61 |
| 487,396 | 12/1892 | Siegert . | |
| 519,051 | 5/1894 | Terry . | |
| 555,411 | 2/1896 | Thain . | |
| 1,014,759 | 1/1912 | Kovacs . | |
| 1,016,143 | 1/1912 | Hansen . | |
| 1,099,344 | 6/1914 | Desenberg et al. . | |
| 1,205,123 | 11/1916 | Bradway . | |
| 1,218,279 | 3/1917 | Kopinski . | |
| 1,272,752 | 7/1918 | Wold . | |
| 1,862,430 | 6/1932 | Robb . | |
| 2,165,812 | 7/1939 | Pfleger ........................ 91/62.6 |
| 2,587,536 | 2/1952 | Scott . | |
| 2,587,537 | 2/1952 | Scott . | |
| 2,606,396 | 8/1952 | Hill . | |
| 2,712,704 | 7/1955 | Mason ........................ 41/19 |
| 2,716,826 | 9/1955 | Huebner ........................ 41/1 |
| 3,042,573 | 7/1962 | Roberts ........................ 156/285 |
| 3,091,403 | 5/1963 | Schraber et al. ........................ 239/413 |
| 3,111,796 | 11/1963 | Meissner ........................ 53/38 |
| 3,211,088 | 10/1965 | Naiman ........................ 101/114 |
| 3,304,573 | 2/1967 | Stefely ........................ 15/553 |
| 3,323,250 | 6/1967 | Gibbons . | |
| 3,429,642 | 2/1969 | Underwood ........................ 401/16 |
| 3,443,337 | 5/1969 | Ehrlich . | |
| 3,554,450 | 1/1971 | D'Muhala ........................ 239/309 |
| 3,584,571 | 6/1971 | Schmoll ........................ 101/1 |
| 3,850,532 | 11/1974 | Kaiser ........................ 401/219 |
| 3,866,838 | 2/1975 | Miles ........................ 239/372 |

(List continued on next page.)

FOREIGN PATENT DOCUMENTS

| 841959 | 5/1970 | Canada ........................ 101/126 |
| 1282259 | 7/1972 | United Kingdom . |

OTHER PUBLICATIONS

Colorblaster Drawing System, submitted as a reference in U.S. Patent 5,322,220 on Jun. 1, 1993.

One photocopy of packaging and two color photographs of product and packaging for Bubble Jumper by Cap Toys, Cleveland, Ohio © 1991.

Seven color photographs of squeeze bubble product entitled "Blastos", purchased in a store in approximately Aug. 1994.

Two color photographs of hoop and circular tray product entitled "Fantastic Bubbles" Imperial Toy Corporation, © 1983.

Three color photographs of white and pink bubble pipe product, Imperial, © 1993.

Five color photographs of pink, orange and purple bubble tube product, Imperial, © 1993.

(List continued on next page.)

Primary Examiner—Jeffrey A. Smith
Attorney, Agent, or Firm—Leydig, Voit & Mayer, Ltd.

[57] ABSTRACT

A method and apparatus for marking a surface with colored bubbles is disclosed. According to the method, bubbles carrying one or more colorants are generated and are applied to a surface to create designs. The disclosed apparatus for marking a surface in this manner can be optionally equipped with a shield defining a volume to maintain the colorant carrying bubbles within a confined area. The apparatus can be further provided with a template having one or more apertures to provide access to predetermined areas of the surface to be marked such that the colored bubbles create predetermined shapes when they burst or are applied.

63 Claims, 22 Drawing Sheets

U.S. PATENT DOCUMENTS

| | | | |
|---|---|---|---|
| 3,921,858 | 11/1975 | Bemm | 222/146 HE |
| 3,971,157 | 7/1976 | Gillis . | |
| 3,995,581 | 12/1976 | Smejda | 118/7 |
| 4,023,526 | 5/1977 | Ashmus et al. | 118/410 |
| 4,146,362 | 3/1979 | Nichols, Jr. | 8/1 |
| 4,162,342 | 7/1979 | Schwartz | 428/159 |
| 4,205,481 | 6/1980 | Tomson . | |
| 4,257,185 | 3/1981 | Tomson . | |
| 4,275,656 | 6/1981 | Choma | 101/211 |
| 4,423,565 | 1/1984 | Bart | 446/16 |
| 4,444,104 | 4/1984 | Mitter | 101/119 |
| 4,628,644 | 12/1986 | Somers | 51/427 |
| 4,630,952 | 12/1986 | Elbaum | 401/48 |
| 4,775,348 | 10/1988 | Collins | 446/16 |
| 4,923,426 | 5/1990 | Klundt | 446/19 |
| 4,943,255 | 7/1990 | Klundt | 446/15 |
| 4,951,876 | 8/1990 | Mills | 239/117 |
| 5,088,903 | 2/1992 | Tomatsu | 417/473 |
| 5,131,598 | 7/1992 | Hoogeveen, Jr. | 239/223 |
| 5,156,684 | 10/1992 | Mayer et al. | 118/301 |
| 5,190,220 | 3/1993 | Bolton | 239/305 |
| 5,224,893 | 7/1993 | Routzong et al. | 446/15 |
| 5,246,631 | 9/1993 | Halbritter | 446/15 X |
| 5,322,220 | 6/1994 | Rehkemper | 239/214 |

OTHER PUBLICATIONS

Six color photographs of orange, yellow and blue bubble blower product, Fischer–Price, © 1992.

Five color photographs of pink tube and green container product entitled "Bubblos" purchased in a store in approximately Aug. 1994.

Two (2) photocopies of the packaging and seven (7) color photographs of the product and packaging for Giant Bubble Gun by Cap Toys, Inc. of Cleveland, Ohio © 1993.

Two (2) photocopies of the packaging and seven (7) color photographs of the product and packaging for Bubble Blaster by Hart Enterprises Inc. of Vancouver, Washington © 1994.

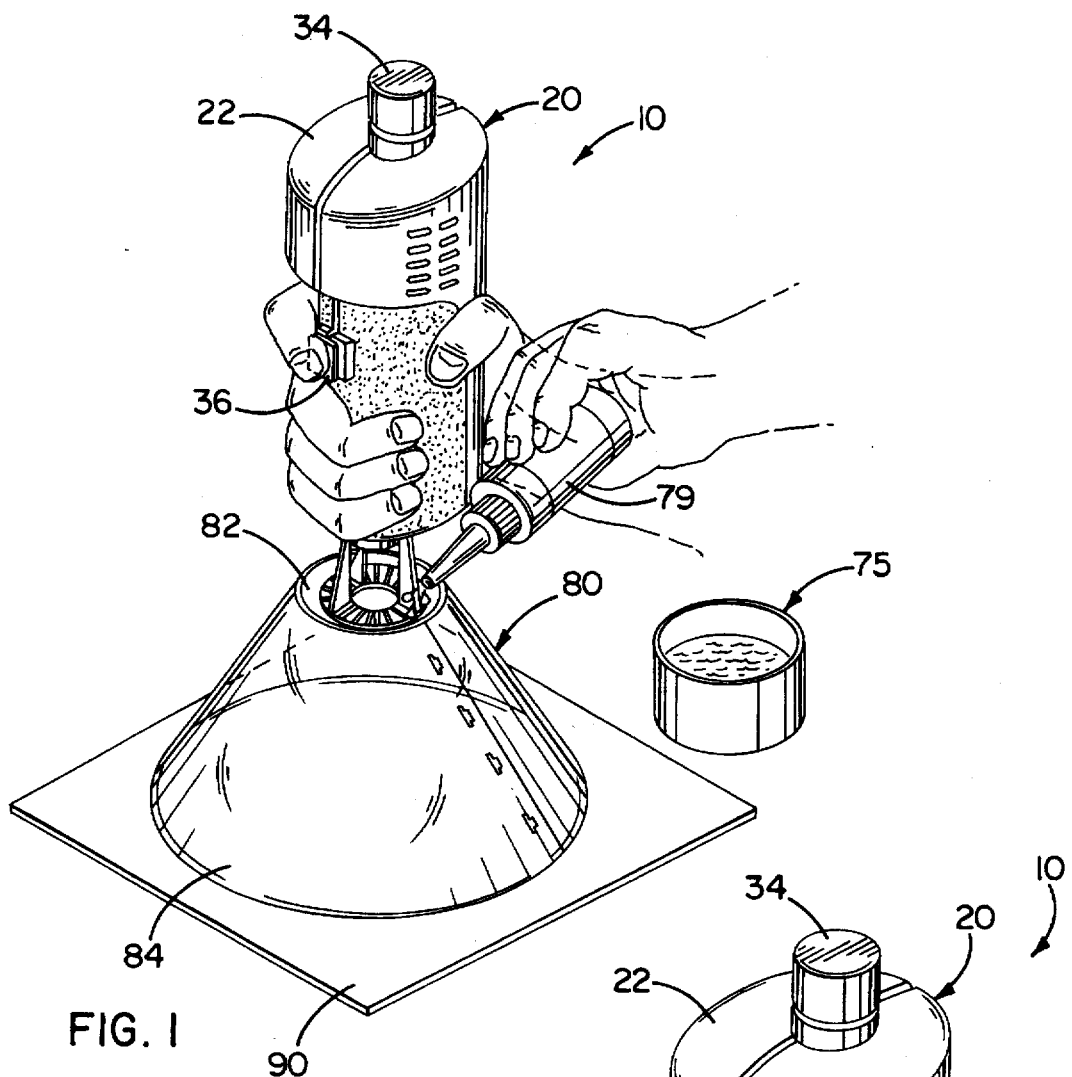

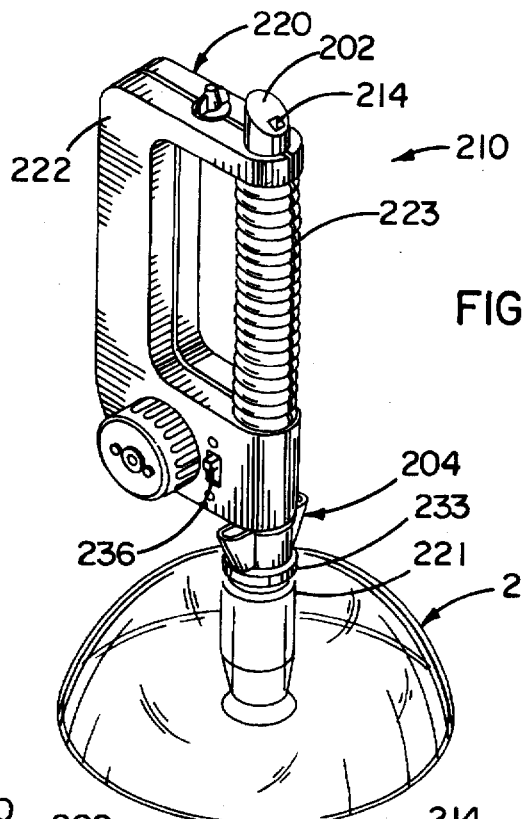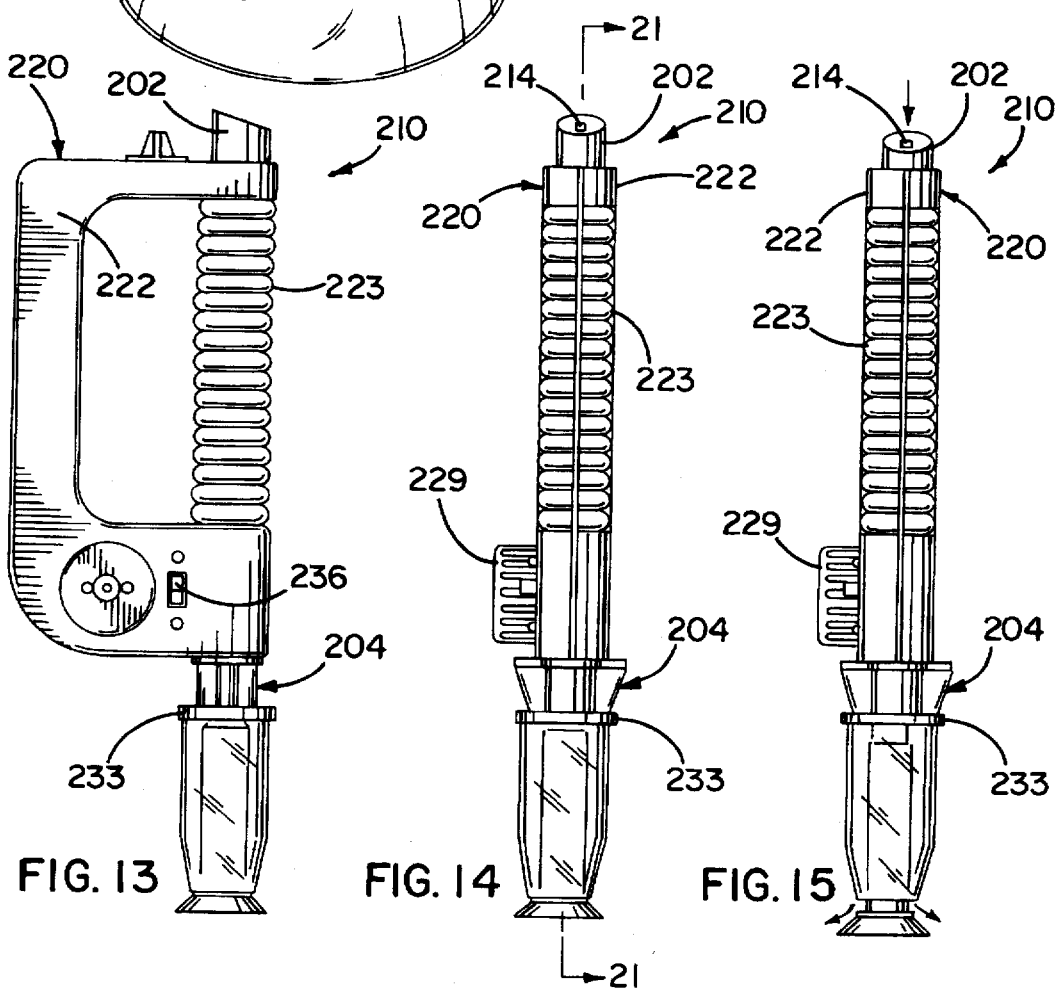

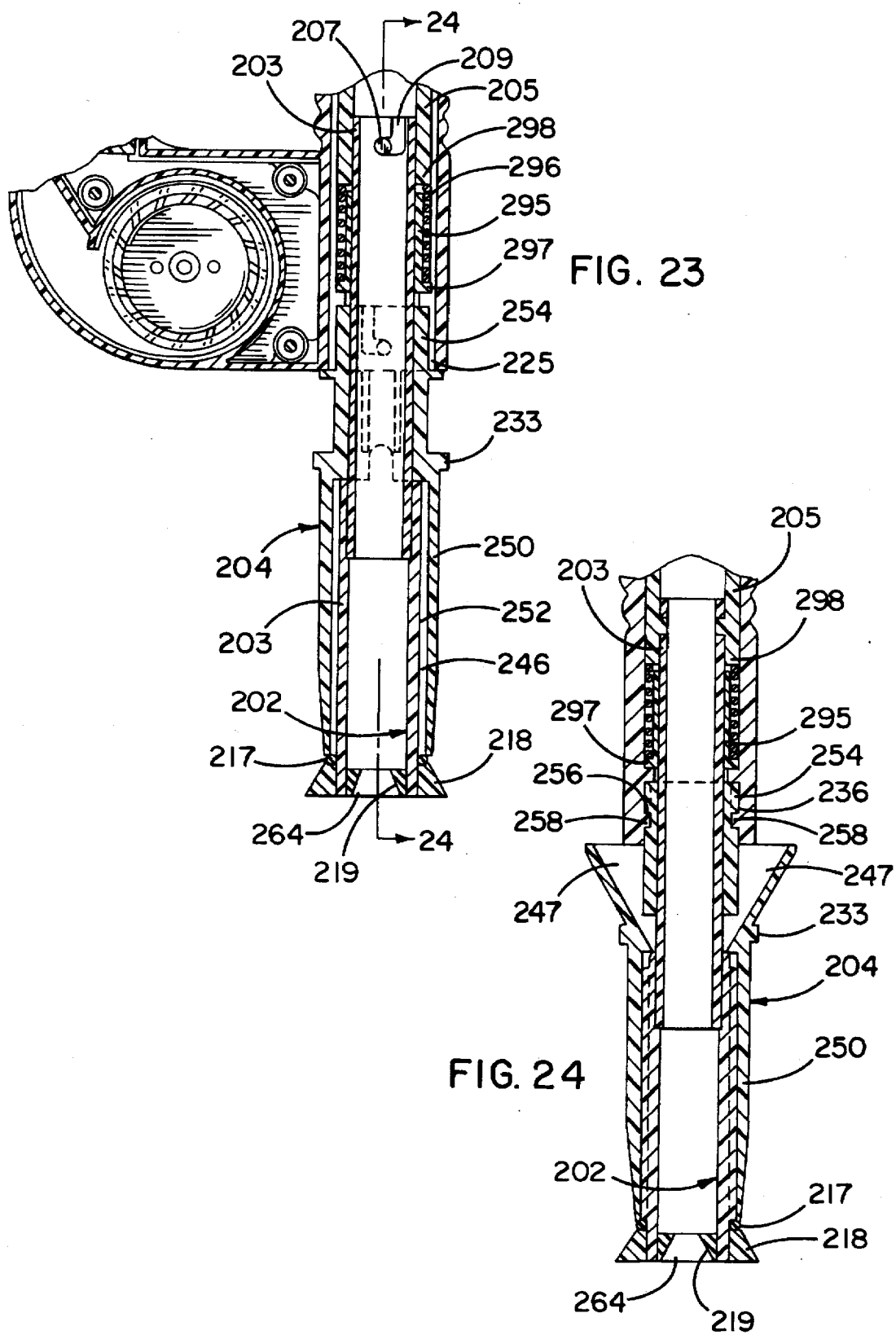

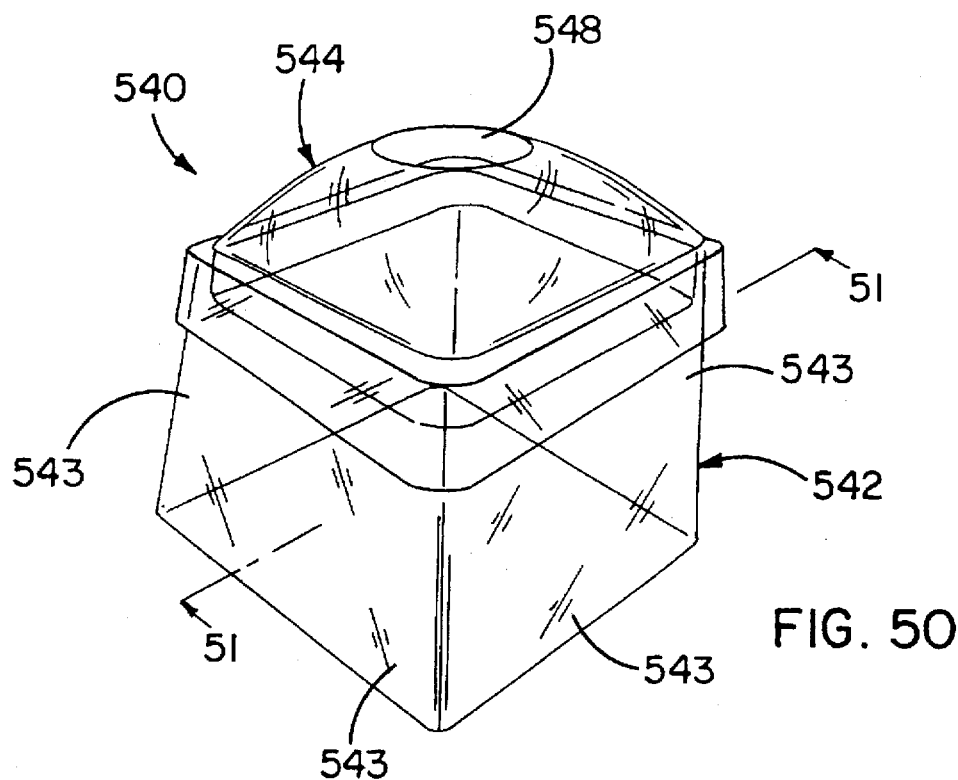
FIG. 50
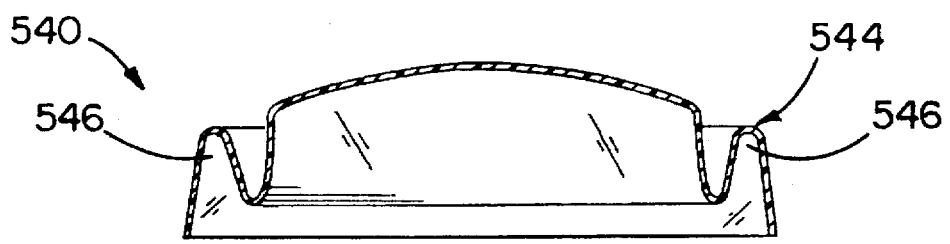
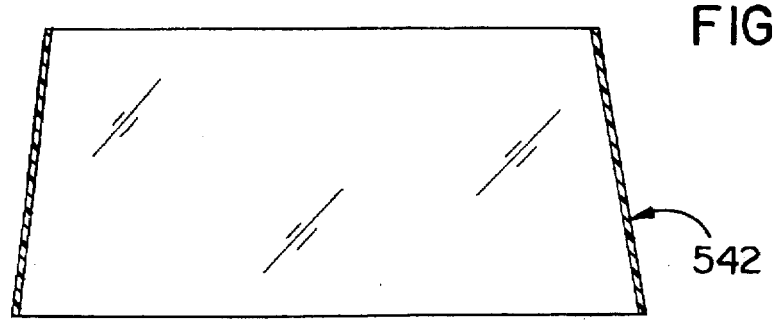
FIG. 51

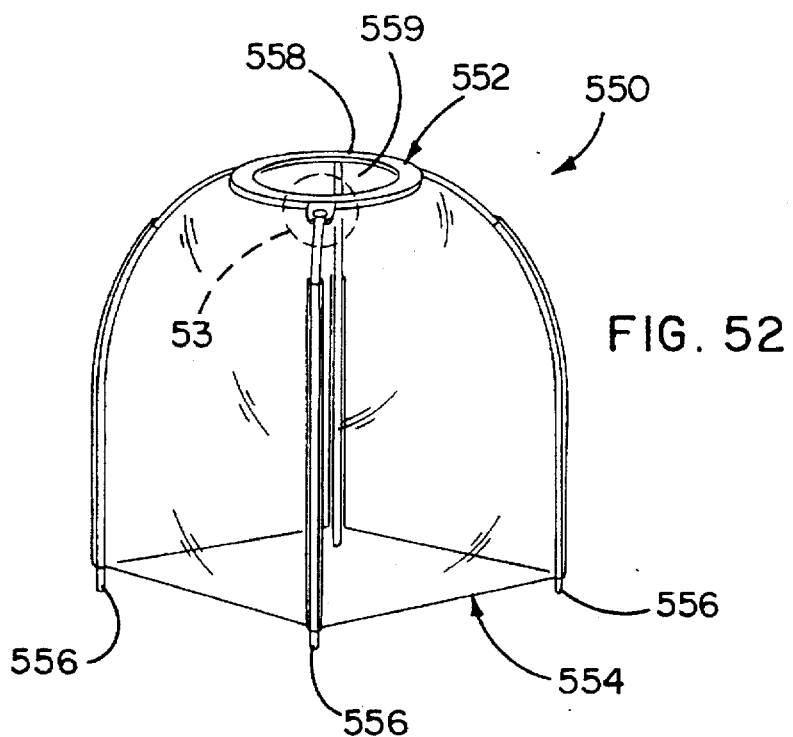
FIG. 52
FIG. 53
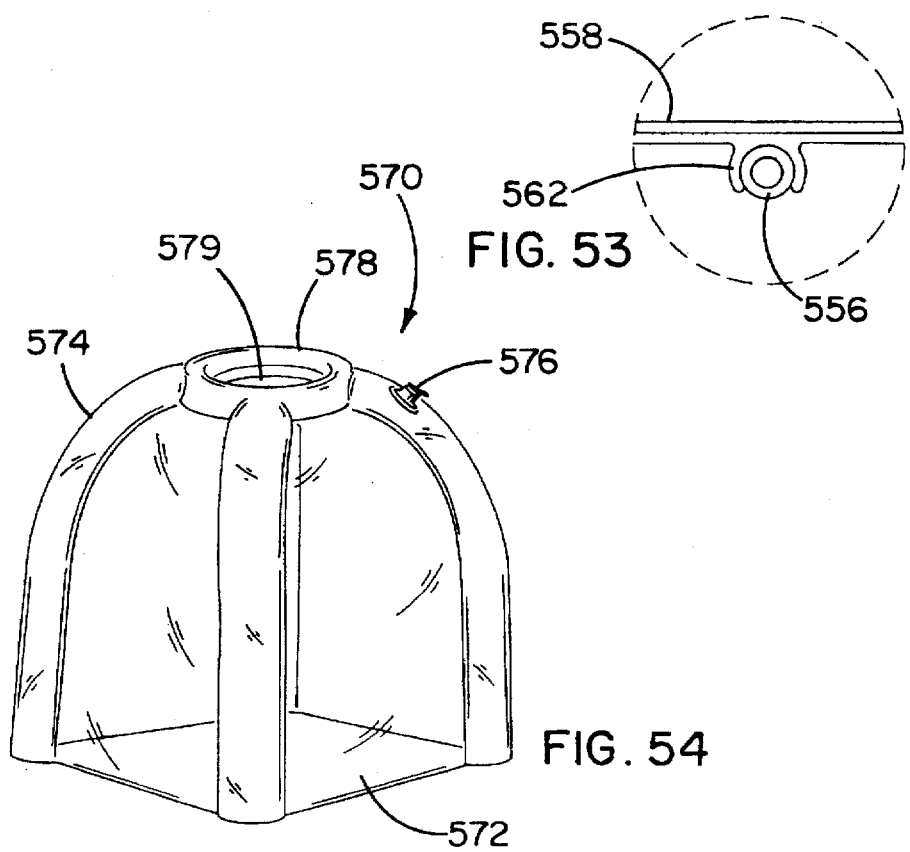
FIG. 54

METHOD, APPARATUS, AND KIT FOR MARKING A SURFACE WITH COLORED BUBBLES

FIELD OF THE INVENTION

This invention relates generally to surface marking instruments and more particularly to a method and apparatus for marking a surface with colored bubbles.

BACKGROUND OF THE INVENTION

Placing designs, representative images, and other markings on surfaces has been a widespread form of entertainment for many years. For example, both children and adults often enjoy creating designs and images on various drawing media such as paper and canvases, or on the surfaces of three dimensional objects to enhance their visual appeal. These markings are typically made by drawing, painting, etching or carving the subject surface.

OBJECTS OF THE INVENTION

It is, therefore, a general object of the present invention to provide a method and apparatus which enables an individual to create a design on a surface by blowing colored bubbles. Even more specifically, it is an object of the invention to provide a method for marking a surface with colored bubbles wherein a user generates bubbles carrying one or more colorants and applies those bubbles to a surface to create visually appealing designs. It is a related object to provide an apparatus for generating bubbles carrying one or more colorants for bursting against or near a surface to thereby apply colorants to the surface in a visually appealing manner. It is yet another object of the invention to provide an apparatus which enables a user to generate colorant bearing bubbles within a controlled area to avoid staining the surrounding environment. It is a further object to provide an apparatus that enables a user to form predetermined shapes on a surface by limiting the access of the colored bubbles to predetermined areas.

SUMMARY OF THE INVENTION

The present invention accomplishes these objectives by providing a method wherein bubbles carrying at least one colorant are applied to a surface to create a design on the subject surface. Variations upon the inventive method include: (1) applying at least one colorant to a forming bubble and then applying or bursting the formed bubble on or near a surface to be marked; and, (2) generating a bubble from a bubble forming solution which has already been pre-mixed with at least one colorant and then applying or bursting the generated bubble on or near a surface to be marked.

The invention further provides an apparatus for creating a design on a surface. In one embodiment, the apparatus includes a bubble forming solution and a film supporting structure for supporting a film of the bubble forming solution. In this embodiment, the apparatus also includes a housing coupled to the film supporting structure and defining an air flow opening. A blower is positioned within the housing to blow air through the air flow opening to displace the film supported by the film supporting structure such that at least a portion of the film forms a bubble. At least one colorant is coupled to this bubble such that the bubble transfers the coloring material to the surface.

In accordance with another aspect of the invention, the apparatus can be optionally provided with a shield defining a volume for confining the colored bubbles generated by the apparatus. The shield may include a first opening and a second opening wherein the first opening is dimensioned to permit introduction of the colored bubbles into the volume and the second opening is dimensioned to expose a surface to the colored bubbles generated by the apparatus. The shield can be coupled to another portion of the apparatus or it can be a free standing structure.

In accordance with yet another aspect of the invention, the apparatus can be optionally provided with a template including at least one aperture dimensioned to provide access to a predetermined area of the surface to be marked such that the colored bubbles create predetermined shapes upon the surface when they burst or are applied.

These and other features and advantages of the invention will be more readily apparent upon reading the following description of the exemplary embodiments of the invention and upon reference to the accompanying drawings wherein:

BRIEF DESCRIPTION OF THE DRAWINGS

FIG. 1 is a right, front perspective view of an apparatus for marking a surface with bubbles constructed in accordance with the teachings of the instant invention.

FIG. 2 is a right front perspective view similar to FIG. 1 but showing the apparatus without the optional shield.

FIG. 12 is a left, front perspective view of an alternative embodiment of the apparatus for marking a surface with bubbles constructed in accordance with the teachings of the instant invention.

FIG. 13 is a right side elevational view of another alternative embodiment of the apparatus constructed in accordance with the teachings of the instant invention.

FIG. 14 is a front elevational view of the apparatus of FIG. 13 showing the central flow tube in the rest position.

FIG. 15 is a view similar to FIG. 14 but showing the central flow tube in the colorant release position.

FIG. 23 is a partial cross-sectional view of the apparatus of FIG. 13 taken along lines 21—21 of FIG. 14.

FIG. 24 is a cross-sectional view taken along lines 24—24 of FIG. 23.

FIG. 50 is a left, front perspective view of yet another alternative shield constructed in accordance with the teachings of the instant invention.

FIG. 51 is a cross-sectional view of the alternative shield of FIG. 50 taken along lines 51—51 of FIG. 50.

FIG. 52 is a right, front perspective view of still another alternative shield constructed in accordance with the teachings of the instant invention.

FIG. 53 is an enlarged view of the area of FIG. 52 labelled 53 illustrating the manner in which the shield shown in FIG. 52 is assembled.

FIG. 54 is a right, front perspective view of another alternative shield constructed in accordance with the teachings of the instant invention.

DESCRIPTION OF THE EXEMPLARY EMBODIMENTS

Figure 3:
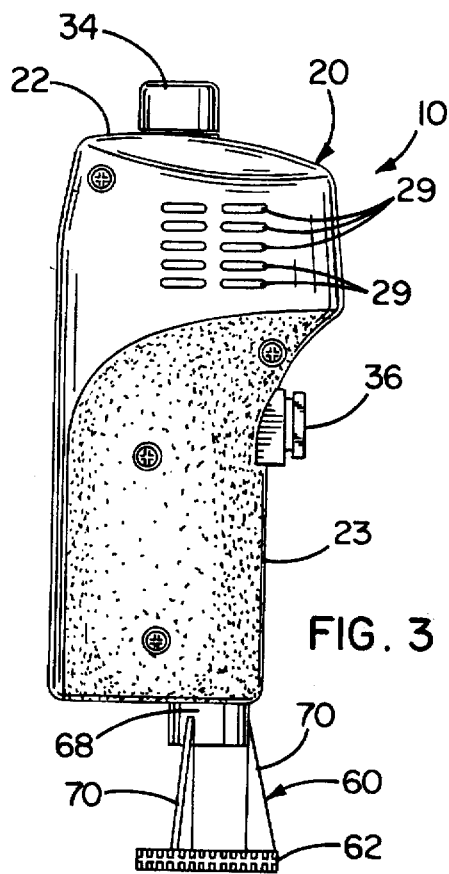
FIG. 3 is a left side elevational view of the apparatus of FIG. 2.

An apparatus for marking a surface with colored bubbles constructed in accordance with the teachings of the present invention is indicated generally by reference numeral 10 in FIG. 1. Although it will be appreciated by those skilled in the art that the inventive apparatus can be constructed in many ways without departing from the scope or the spirit of the instant invention, in the most preferred embodiments the apparatus includes a bubble generating device 20 which is capable of generating bubbles carrying at least one colorant and a shield 80 which provides access to the surface to be marked while confining the colorant carrying bubbles to a defined volume. This preferred combination enables a user to readily mark a surface without inadvertently soiling the surrounding environment.

However, it will be readily appreciated by those skilled in the art that the shield 80 is optional. Thus, if desired, one can construct an apparatus for marking a surface with colored bubbles comprising only a bubble generating device 20. Such an apparatus 10 including only a bubble generating device 20 is shown generally in FIG. 2. As illustrated in that Figure, the bubble generating device 20 preferably includes a housing 22 for generating a stream of air and a film supporting structure 60 for positioning a film 77 of bubble forming solution in the path of the air stream such that the air stream forms the film 77 into bubbles.

Figure 10:
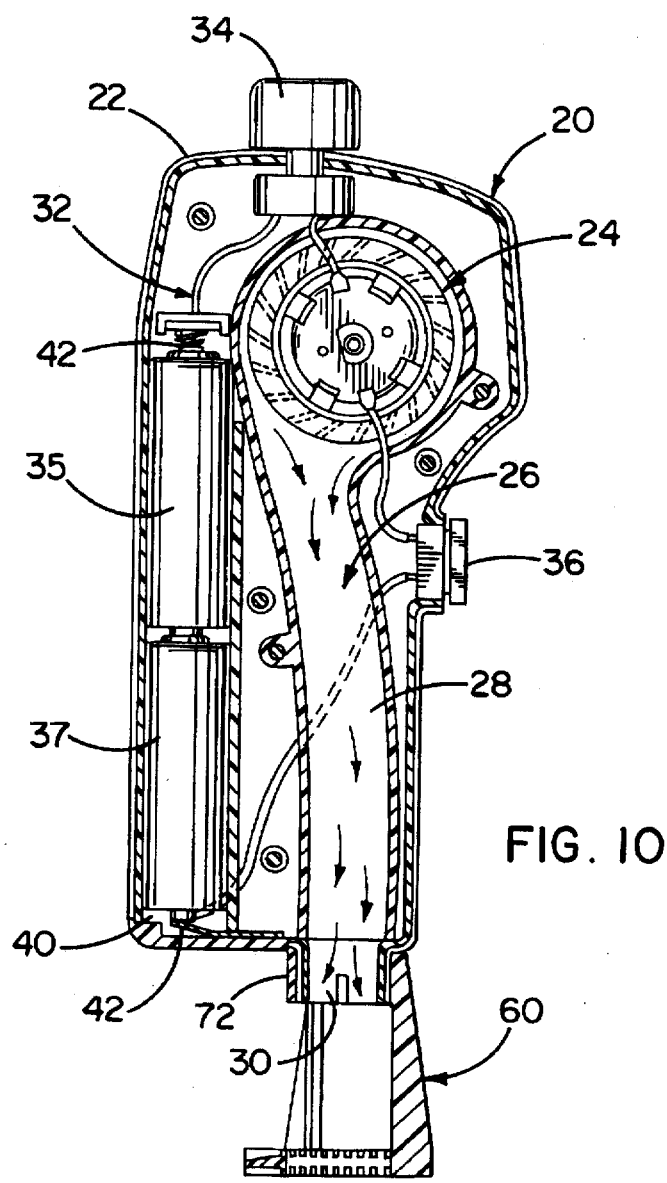
FIG. 10 is a cross-sectional view of the apparatus taken along lines 10—10 of FIG. 4.

As illustrated in FIG. 10, the housing 22 is provided with an electrically actuated blower 24 for generating the aforementioned stream of air. This blower 24 is preferably positioned within an internal cavity 26 defined by the housing 22 which funnels the air blown by the blower 24 into a stream by directing it through an elongated air flow channel 28. This air flow channel 28 communicates with an air flow opening 30 formed in the housing 22 which, thus, serves to permit the air stream generated by the blower 24 to pass to the exterior environment.

In order to provide the blower 24 with air, the housing includes a plurality of vents 29 as illustrated in FIGS. 2, 3, 4, and 5. These vents 29 communicate with the internal cavity 26 to permit air to flow to the blower 24. Thus, when the blower 24 is actuated, it draws air into the internal cavity 26 through the vents 29 and then directs it through the air flow channel 28 and the air flow opening 30 to the exterior environment.

Figure 11:
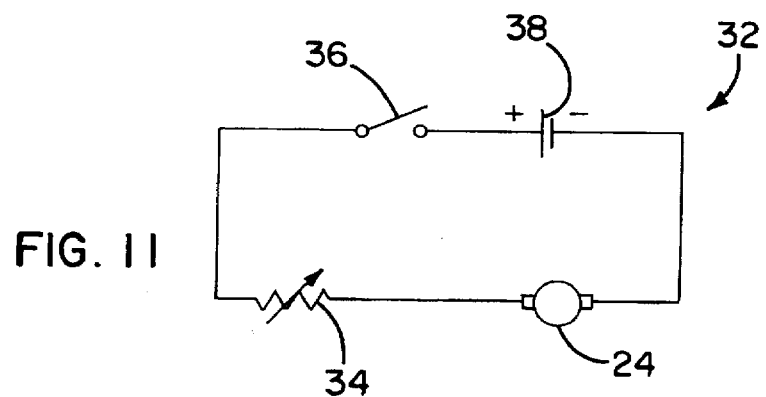
FIG. 11 is a schematic diagram of the preferred electrical circuit employed in the apparatus.

In order to control the operation of the blower 24, the bubble generating device 20 is provided with an electrical circuit 32 as shown in FIGS. 10 and 11. That circuit 32 preferably includes the blower 24, a manually engageable potentiometer 34, a manually engageable switch 36, and a battery 38 connected in series. In use, a user can depress the manually engageable switch 36 to initiate current flow to the blower 24 and then manipulate the potentiometer 34 to control the amount of current the blower 24 receives. Thus, it will be appreciated by those skilled in the art that the preferred circuit 32 enables a user to switch the blower 24 between the "off" state and the "on" state to initiate and terminate air flow and also enables a user to control the speed of the blower 24 and, thus, the amount of air flow generated by the device 20.

Figure 7:
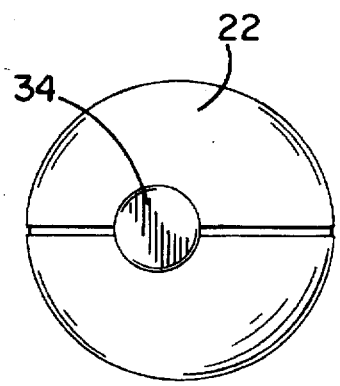
FIG. 7 is a top plan view thereof.

In the preferred embodiment, the battery 38 comprises two series connected 1.5 volt batteries 35, 37 as shown in FIG. 10. To this end, the housing 22 is preferably provided with a battery compartment 40 having spring contacts 42 for electrically connecting the batteries 35, 37 with the remainder of the circuit 32. As most easily seen in FIGS. 8 and 9, the housing 22 preferably includes a cover 41 which can be removed to provide access to the battery compartment 40. As illustrated in FIG. 1, the switch 36 is preferably positioned to enable a user to readily actuate the blower 24 with one hand. In other words, the switch 36 is positioned such that a user can easily use a finger to toggle the switch 36 between the "on" and "off" states while holding the device in one hand. As shown in FIG. 7, the manually engageable portion of the potentiometer 34 is positioned on top of the housing 22 and, therefore, requires the user to employ a second hand to adjust the air flow while holding the device 20.

Figure 4:
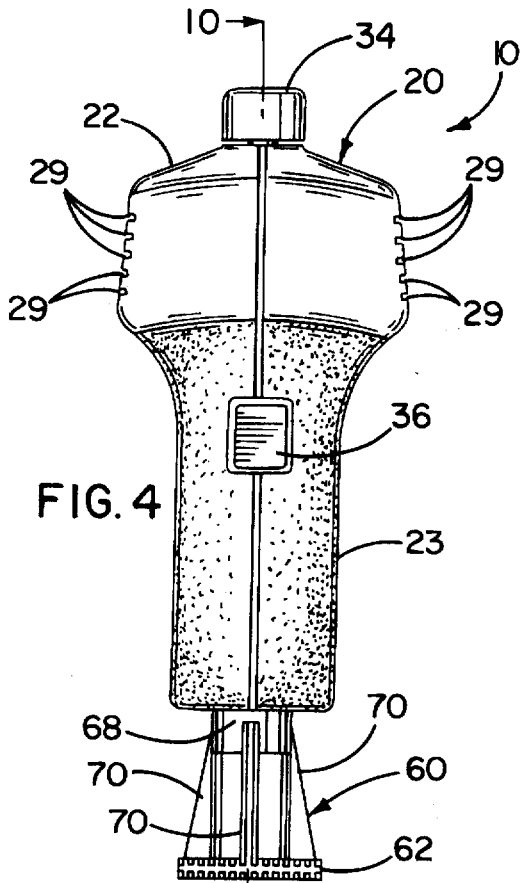
FIG. 4 is a front elevational view thereof.
Figure 5:
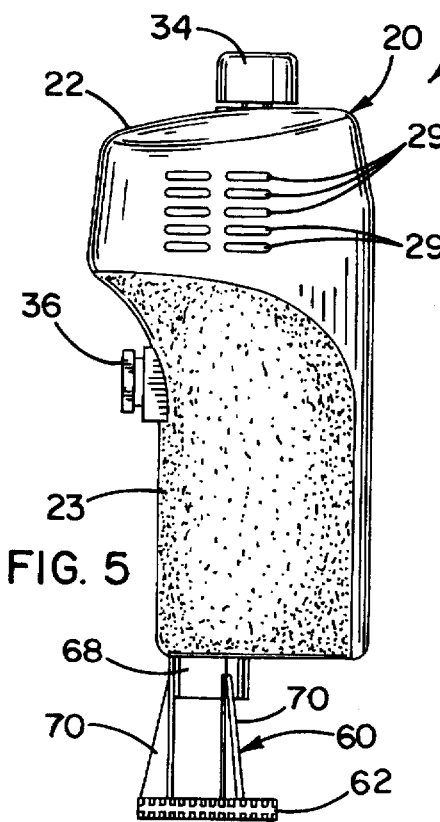
FIG. 5 is a right side elevational view thereof.
Figure 6:
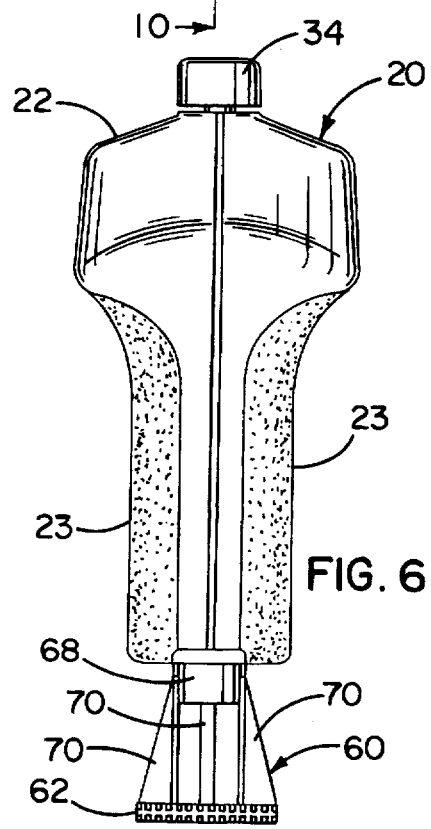
FIG. 6 is a rear elevational view thereof.

With respect to the exterior of the bubble generating device 20, the housing 22 is preferably dimensioned to permit a user to grip the device 20 with one hand. To this end, the housing 22 is preferably tapered as illustrated in FIGS. 4 and 6. In addition, the housing 22 preferably includes a roughened or stippled surface 23 to decrease the likelihood that the device 20 will slip from a user's hand during use. As explained in further detail below, the device 20 is preferably used in connection with a bubble forming solution such as a soap solution. In the event that a user's hands become soiled with this soap solution, the roughened surface 23 should be easier to grip than a smooth surface.

Figure 8:
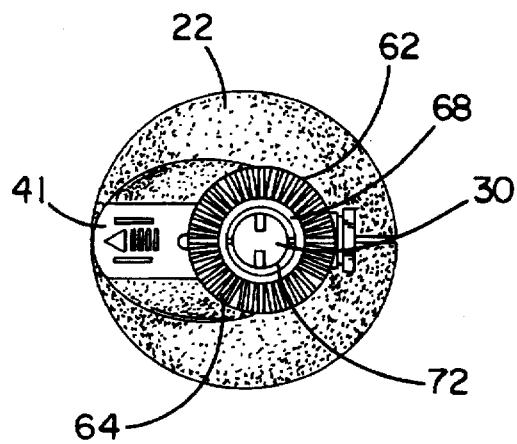
FIG. 8 is a bottom plan view thereof.
Figure 9:
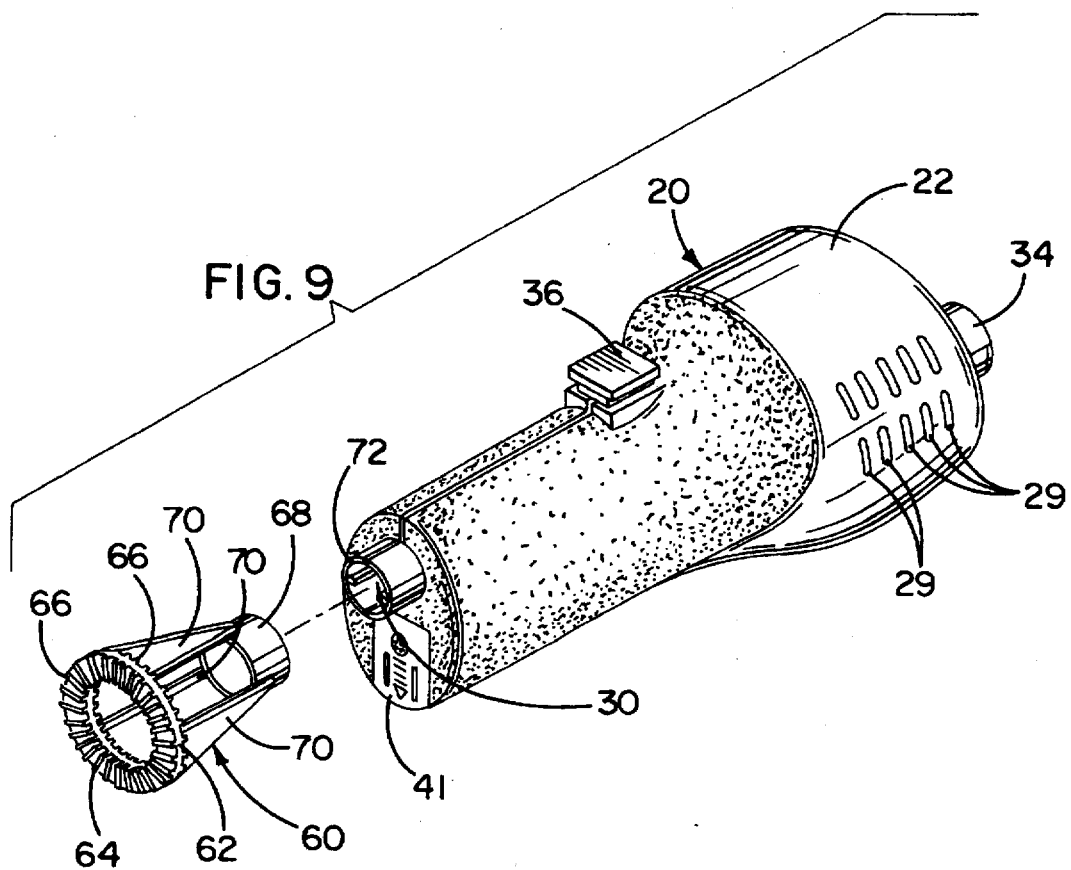
FIG. 9 is a partially exploded view showing the housing and the film support structure of the apparatus of FIG. 2 separated.

As mentioned above, the bubble generating device 20 preferably includes a film supporting structure 60 for supporting a film of bubble forming solution within the path of the stream of air generated by the housing 22. As illustrated in FIG. 9, the film supporting structure 60 preferably includes an annular ring 62 defining an opening 64 and a coupling ring 68 which are secured together by three support arms 70. As shown in FIG. 9, the coupling ring 68 matingly receives a cylindrical projection 72 of the housing 22 defining the air flow opening 30 to couple the film supporting structure 60 to the housing 22. Thus, the support arms 70 serve to separate the annular ring 62 a distance from the housing 22 and to maintain the opening 64 of the annular ring 62 in substantial alignment with the air flow opening 30 of the housing 22 as illustrated in FIG. 8.

When a user wishes to employ the preferred bubble generating device 20 to mark a surface, the user first dips the annular ring 62 of the film supporting structure 60 into a bubble forming solution such as a soap solution contained in a container 75 such as that illustrated in FIG. 1. Dipping the annular ring 62 into the bubble forming solution in this manner will form a film 77 of the solution in the opening 64 as shown in FIG. 2. The user then employs an applicator such as a bottle 79, eye dropper, paint brush, elongated rod or other applicating device to apply one or more colorants such as ink, paint, food coloring, or other materials to the annular ring 62. The user then actuates the switch 36 thereby causing the bubble generating device 20 to generate a stream of air which passes through the opening 64 to displace the film 77 until it forms a colored bubble. This colored bubble is then applied to a surface 90 to transfer the colorants thereto.

Figure 36:
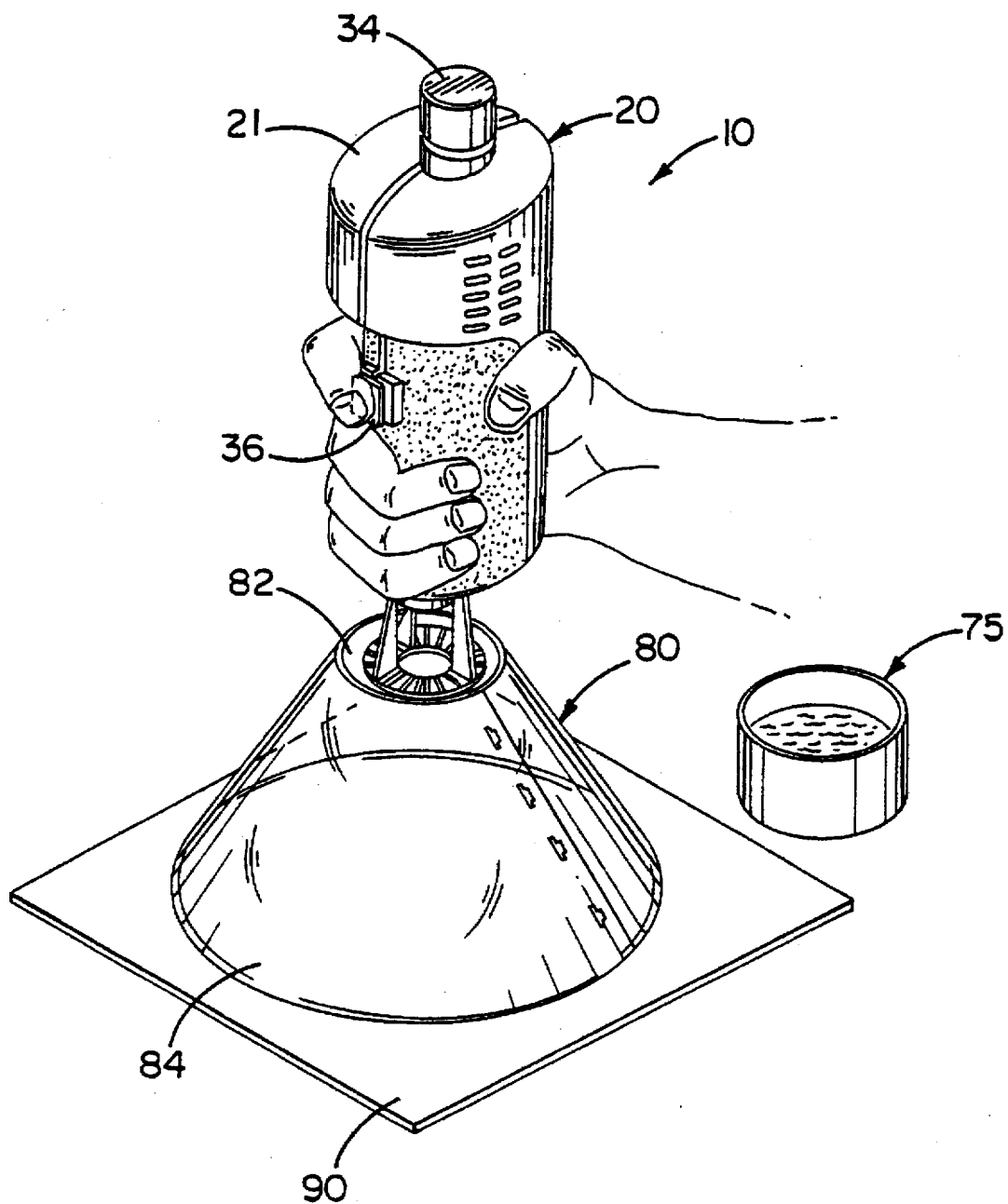
FIG. 36 is a right, front perspective view of still another alternative embodiment of the apparatus for marking a surface.

Although in the preferred embodiment, a colored bubble is formed by applying one or more colorants to the annular ring 62, those skilled in the art will readily appreciate that other methods of applying the colorants might likewise be appropriate. For example, the colorants could be applied directly to the bubble and/or to the film supporting structure 60 either immediately before generating a bubble, while the bubble is being formed, or after the bubble is formed without departing from the scope or the spirit of the invention. In addition, those skilled in the art will readily appreciate that other methods of generating colored bubbles could be employed without departing from the scope or the spirit of the instant invention. For example, rather than applying colorants to a bubble with an applicator 79 as described above, a user could mix the bubble forming solution with at least one colorant in a container 75 as illustrated in FIG. 36. Then, when the user dips the annular ring 62 of the film supporting structure 60 into the container 75, a film including the bubble forming solution and the colorants is formed in the opening 64. The user can then actuate the switch 36 to form colored bubbles. Similarly, a user could form colored bubbles by applying one or more colorants to the annular ring 62 and then dipping the ring 62 into a container 75 of bubble forming solution to form a colored film 77.

It will be understood throughout this application that the term "colorant" is defined to mean a substance having any color or any shade of any color. Thus, substances that make a black, white, yellow, red or green mark on a surface when used in connection with the disclosed apparatus would all be "colorants" as would substances which create marks of any other color or shade of color when so employed. It will further be understood that the terms "colored bubbles" and "colorant carrying bubbles" are defined to be synonymous and shall include at least the following: bubbles having a colorant on any portion of their surfaces; bubbles which carry colorant; bubbles formed from one or more colorant; bubbles formed from colored bubble forming solution; and bubbles formed from a mixture of one or more colorants and a bubble forming solution.

In order to facilitate the bubble generating process, the upper and lower surfaces of the annular ring 62 preferably include a plurality of radially disposed surface ridges 66. As most easily seen in FIG. 2, adjacent ones of these radially disposed surface ridges 66 define radially disposed channels which, when the film supporting structure 60 has been dipped in bubble forming solution, serve to retain a portion of the solution along the ring 62. Thus, when a stream of air is blown through the opening 64 to displace the film 77, additional solution will generally flow from the channels into the opening 64 to enable the film 77 to grow or spread into a bubble.

Figure 34:
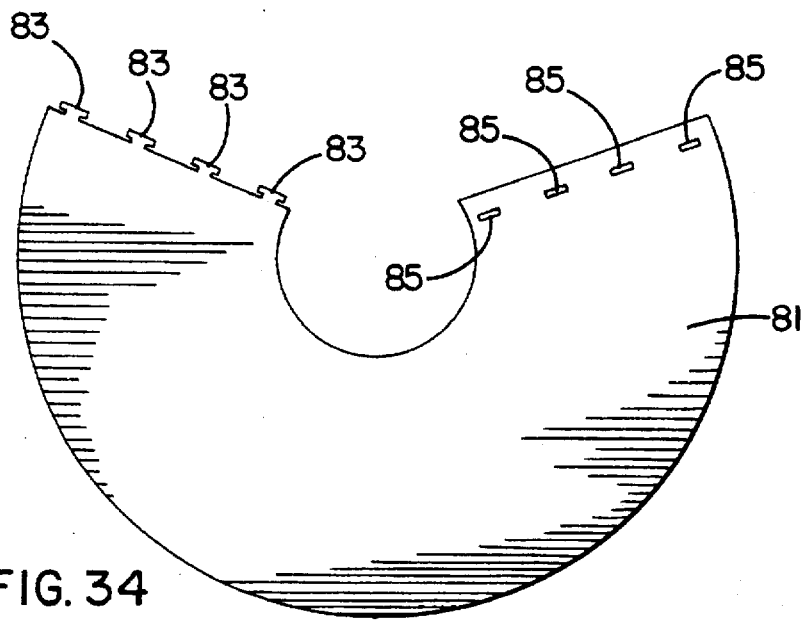
FIG. 34 is a top plan view of the preferred embodiment of the shield shown in an unassembled state.

As illustrated in FIG. 1, the apparatus 10 preferably includes a shield 80 defining a volume for confining the colored bubbles generated by the bubble generating device 20. This shield 80 is preferably constructed from a flat sheet 81 of substantially clear plastic. As illustrated in FIG. 34, this sheet 81 includes a plurality of tabs 83 and mating slots 85. When the tabs 83 are positioned within the slots 85, the sheet 81 forms the three dimensional shield 80 shown in FIG. 1.

This shield 80 has a substantially conical shape and includes two openings. A first opening or aperture 82 is positioned at the top of the shield 80 and is dimensioned to permit introduction of the colored bubbles into the shield's volume. A second opening or aperture 84 is positioned at the bottom of the shield 80 and is dimensioned to expose a portion of the surface 90 to be marked to the colored bubbles contained in the volume. Thus, it will be appreciated by those skilled in the art that, when the shield 80 is employed, it ensures that the colored bubbles generated by the bubble generating device 20 burst only within the volume defined by the shield 80 and do not inadvertently soil the surrounding environment.

When employing the shield 80 in the manner illustrated in FIG. 1, the user first positions a surface 90 to be marked such as a sheet of paper on a table or the like and then positions the shield 80 upon the surface 90. The user then dunks the annular ring 62 of the film supporting structure 60 into the container 75 to form a film 77 of the bubble forming solution that at least partially covers the opening 64 defined by the ring 62. The user then positions the film supporting structure 60 of the bubble generating device 20 within the first opening 82 of the shield 80 and applies one or more colorants to the bubble and/or the film supporting structure 60. The user then actuates the blower 24 to thereby form a colored bubble as described above. This colored bubble will then burst within the shield in proximity to the surface 90 thereby transferring the colorants carried by the bubble to the surface 90 to create a visually appealing design.

It should be noted that for purposes of this application the phrase "in proximity to" shall mean "on or near". Thus, bubbles which burst while in physical contact with a surface and bubbles which burst above a surface will both be considered to have burst in proximity to that surface. In addition, it should be noted that in practice, the colored bubbles may not burst against the surface without assistance from the user. For example, it may be necessary for a user to physically burst bubbles resting upon the surface by touching the bubbles with the apparatus, a stick, a finger, or some other structure. Thus, throughout this application, it will be understood that the act of bursting bubbles resting on a surface and the act of bursting bubbles above the surface both fall within the definition of "applying bubbles" to a surface.

Figure 33:
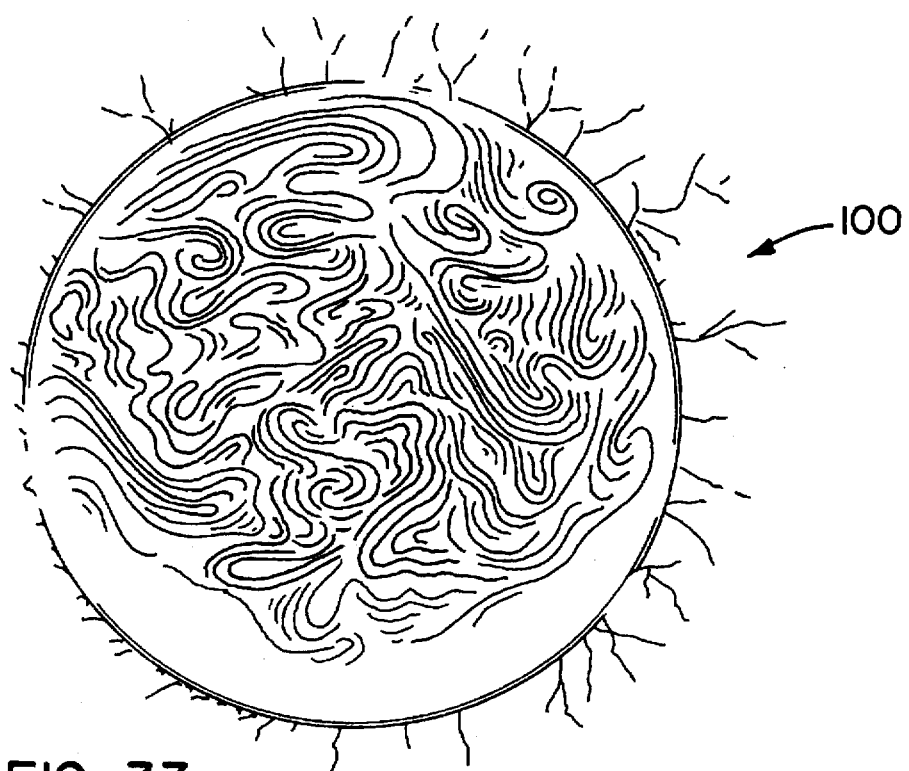
FIG. 33 is a representation of a design the apparatus might be used to create.

A representation 100 of one type of design this method and apparatus can be used to create is illustrated in FIG. 33. As illustrated by this representation 100, the disclosed apparatus and method can be used to create random designs. It will be appreciated by those skilled in the art that bubbles produced in accordance with the instant invention may not have a uniform thickness. In other words, these bubbles may have low areas and high areas on their surface. Colorants applied to the surface of these bubbles will have a tendency to gather in the low areas of the bubble. Consequently, when these bubbles are applied to a surface, the colorants they carry may not be evenly distributed over the surface.

Figure 32:
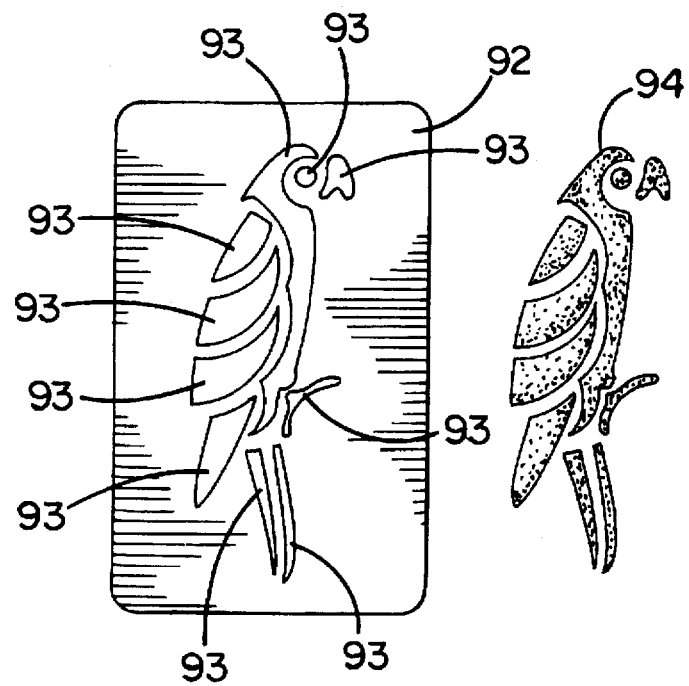
FIG. 32 is a top plan view of a template and a representation of an image such a template might be used to form.

In accordance with another aspect of the invention, the apparatus 10 can be optionally provided with a template 92 for restricting the exposed area of the surface 90 to be marked such that the colorant carrying bubbles create a predetermined shape 94 on the surface 90 when they burst or are applied. For example, the template 92 illustrated in FIG. 32 includes several apertures 93 which are shaped to form the image of a parrot. Thus, if a user positions the template 92 over the surface 90 and applies colored bubbles against it, the areas of the surface 90 exposed by the apertures 93 will be exposed to the colorants carried by the bubbles and, consequently, an image of a parrot 94 similar to that illustrated in FIG. 32 will be formed on the surface 90.

It will be appreciated by those skilled in the art that different templates 92 having different apertures 93 can be used to create different images 94. Similarly, it will be appreciated that a plurality of templates which are designed such that each template exposes one or more portions of a complete image to enable the creation of an image having different colored sections could also be used without departing from the scope or the spirit of the invention. For example, the apparatus 10 might include two templates. One of these templates might include apertures shaped to form only the head and feet of a parrot while the other aperture might include apertures which are shaped to form only the body of the parrot. The user could then use the "head and feet" template in combination with bubbles carrying a red colorant to mark a red head and red feet on the surface. By removing the "head and feet" template and replacing it with the "body" template, a user could employ bubbles carrying a blue colorant to mark a blue body on the surface. If the templates were employed in the same position with respect to the surface, the user will have created a red and blue parrot.

Figure 35:
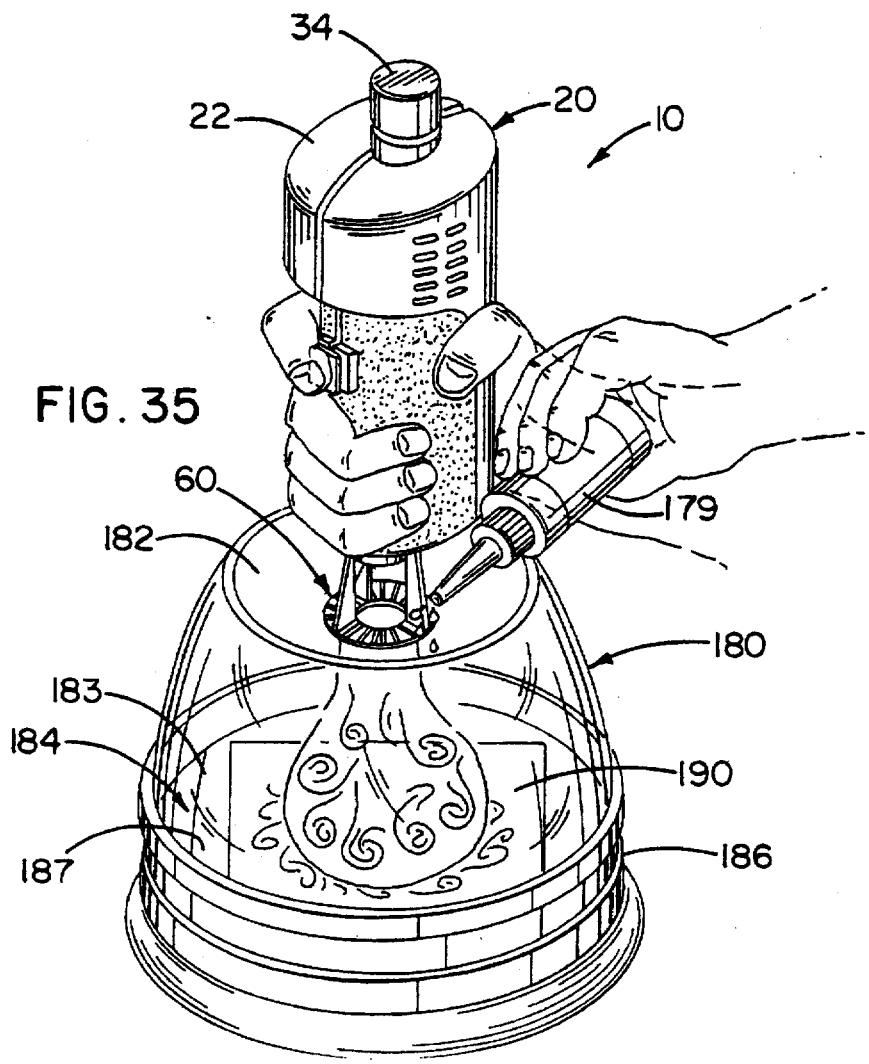
FIG. 35 is a right, front perspective view of yet another alternative embodiment of the apparatus for marking a surface.

It will be appreciated by those skilled in the art that although the preferred embodiment of the shield 80 has a conical shape as illustrated in FIG. 1, shields having other shapes and sizes could also be employed without departing from the scope or spirit of the invention. For example, a shield 180 having a spherical shape as shown in FIG. 35 could also be used without departing from the scope of the invention. As illustrated in FIG. 35, this alternative shield 180 includes a first opening 182 for providing access to the volume defined by the shield 180 and a second opening 184 for exposing the surface 190 to be marked to the colorant carrying bubbles. In this embodiment, the shield 180 is further provided with a lower portion 186 which forms a platform 187 for supporting the surface 190 to be marked. This lower portion 186 is detachable from the remainder of the shield 180 to enable a user to position various objects to be marked on the platform 187.

A number of additional alternative shields constructed in accordance with the teachings of the instant invention are illustrated in FIGS. 37–52. These shields are all preferably constructed to minimize space in packaging. Specifically, all of these alternative shields can be packaged and sold as disassembled units which can be easily assembled by a purchaser. In addition, each of these shields define at least two openings. A first opening to provide access to the interior of the shield and a second opening to provide access to at least a portion of a surface to be marked.

Figure 40:
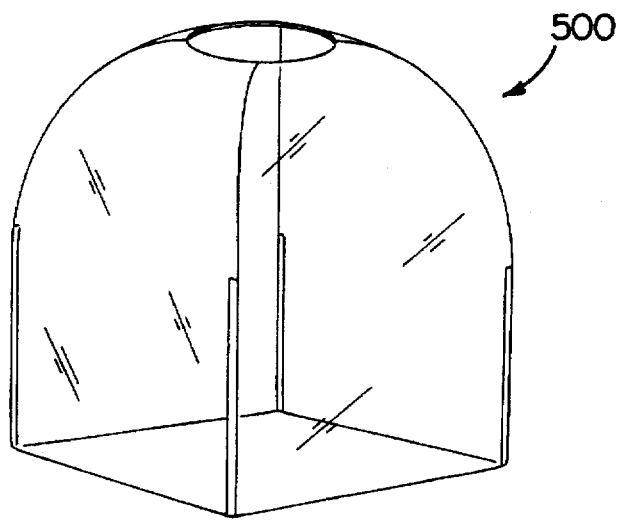
FIG. 40 is a right, front perspective view of an alternative shield constructed in accordance with the teachings of the instant invention.
Figure 41:
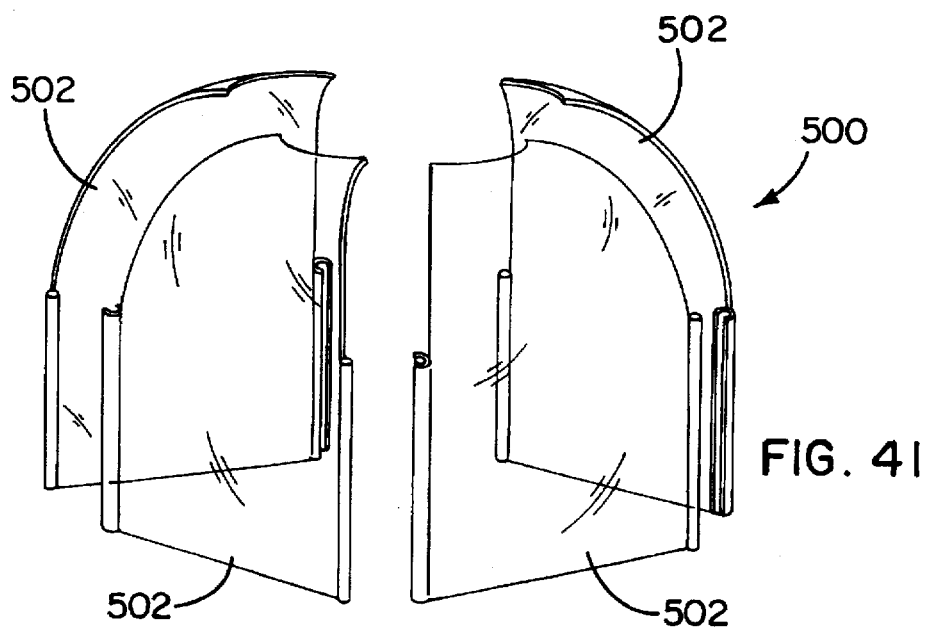
FIG. 41 is an exploded view of the shield illustrated in FIG. 40.
Figure 42:
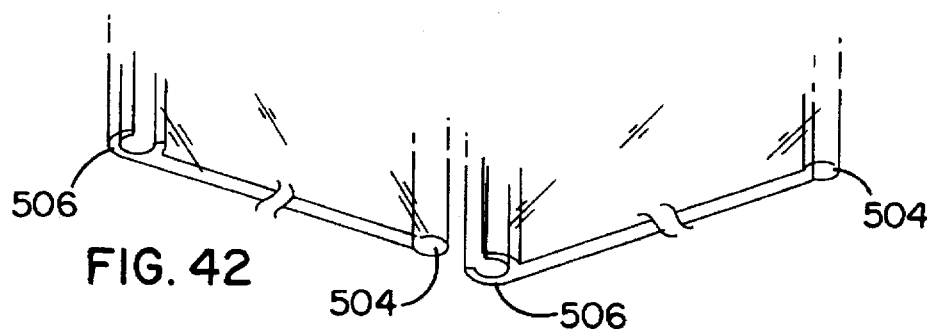
FIG. 42 is an enlarged view of the lower portion of the shield shown in FIG. 40 illustrating the connection of the shield's adjacent sides.

An alternative shield constructed in accordance with the teachings of the instant invention is indicated generally in FIG. 40 by reference numeral 500. As illustrated in FIG. 41, the shield 500 preferably includes four sides 502 which can be coupled together to define a volume for containing bubbles. As illustrated in FIG. 42, each side 502 of the shield 500 includes oppositely disposed edges having a tab portion 504 and a groove portion 506. The groove portion 506 of each side 502 is received by the tab portion 504 of an adjacent side 502 to secure the sides 502 together as shown in FIG. 40.

Figure 43:
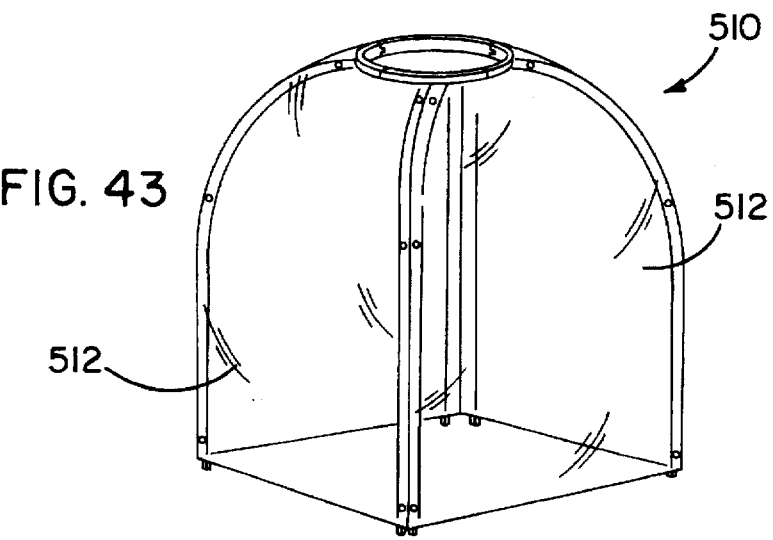
FIG. 43 is a right, front perspective view of another alternative shield constructed in accordance with the teachings of the instant invention.
Figure 44:
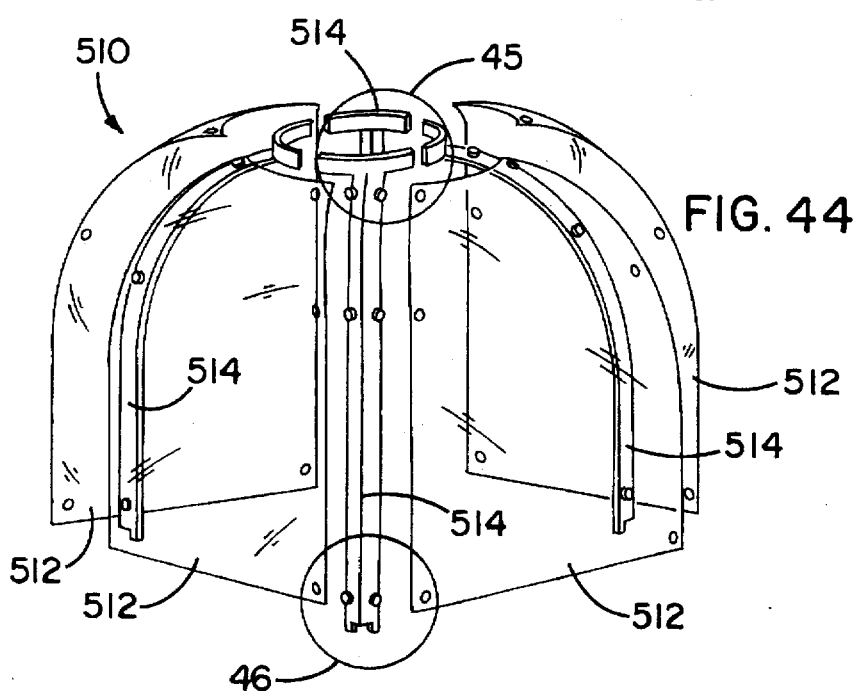
FIG. 44 is an exploded view of the shield illustrated in FIG. 43.
Figure 45:
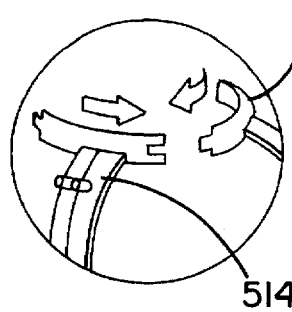
FIG. 45 is an enlarged view of the area labelled with the numeral 45 in FIG. 44 showing the manner in which the shield is assembled.
Figure 46:
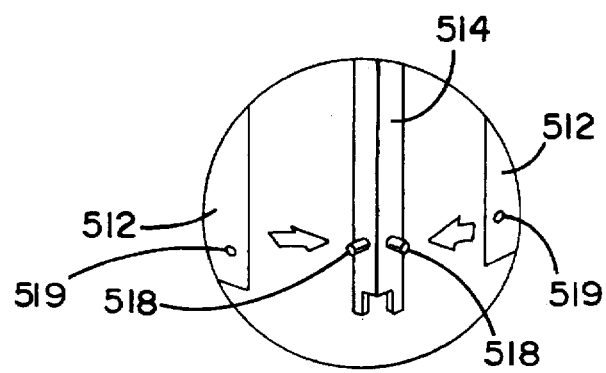
FIG. 46 is an enlarged view of the area labelled with the numeral 46 in FIG. 44 showing the manner in which shield is assembled.

Another alternative shield constructed in accordance with the teachings of the instant invention is indicated generally in FIG. 43 by reference numeral 510. As illustrated in FIG. 44, the shield 510 preferably includes four sides 512 and four frame portions 514. The frame portions 514 include a tab and groove arrangement as shown in FIG. 45 which enable adjacent ones of the four frame portions 514 to be operatively engaged. As shown in FIG. 46, the frame portions are further provided with projections 518 which mate with openings 519 on the sides 512 such that the sides 512 are secured to the frame portions 514. The frame portions 514 and the sides 512, thus, combine to define a volume for containing bubbles as shown in FIG. 43.

Figure 47:
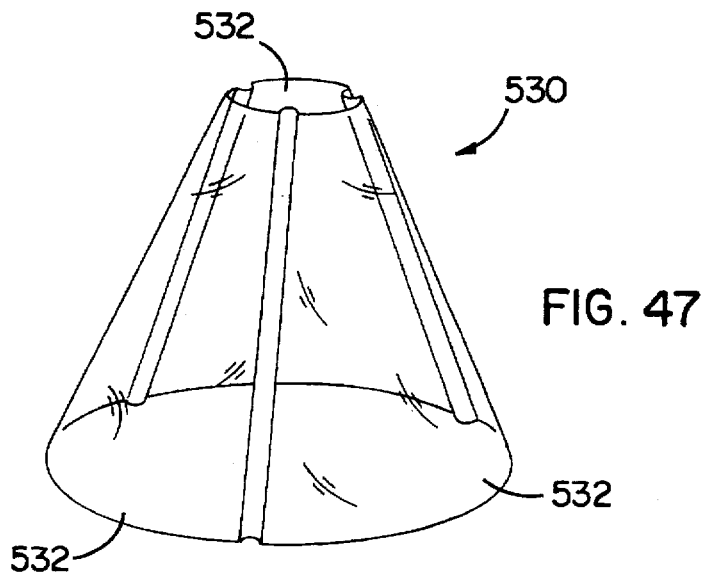
FIG. 47 is a right, front perspective view of another alternative shield constructed in accordance with the teachings of the instant invention.
Figure 48:
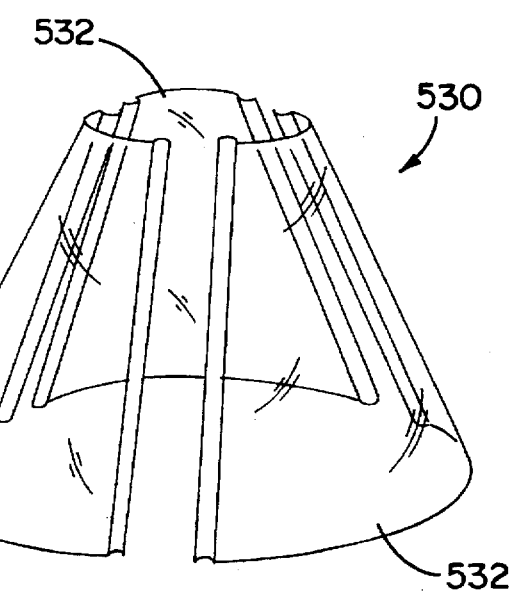
FIG. 48 is an exploded view of the shield shown in FIG. 47.
Figure 49:
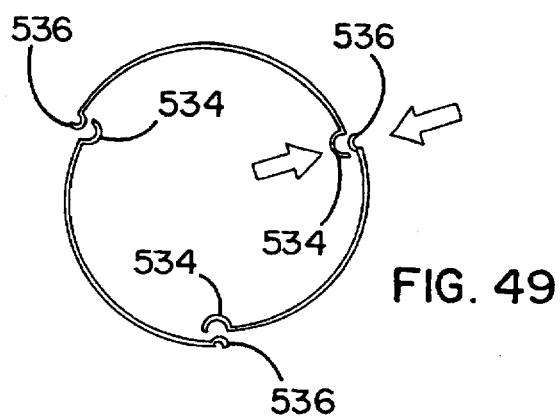
FIG. 49 is a schematic view of the top of the shield illustrated in FIG. 47 showing the manner in which the shield is assembled.
Figure 55:
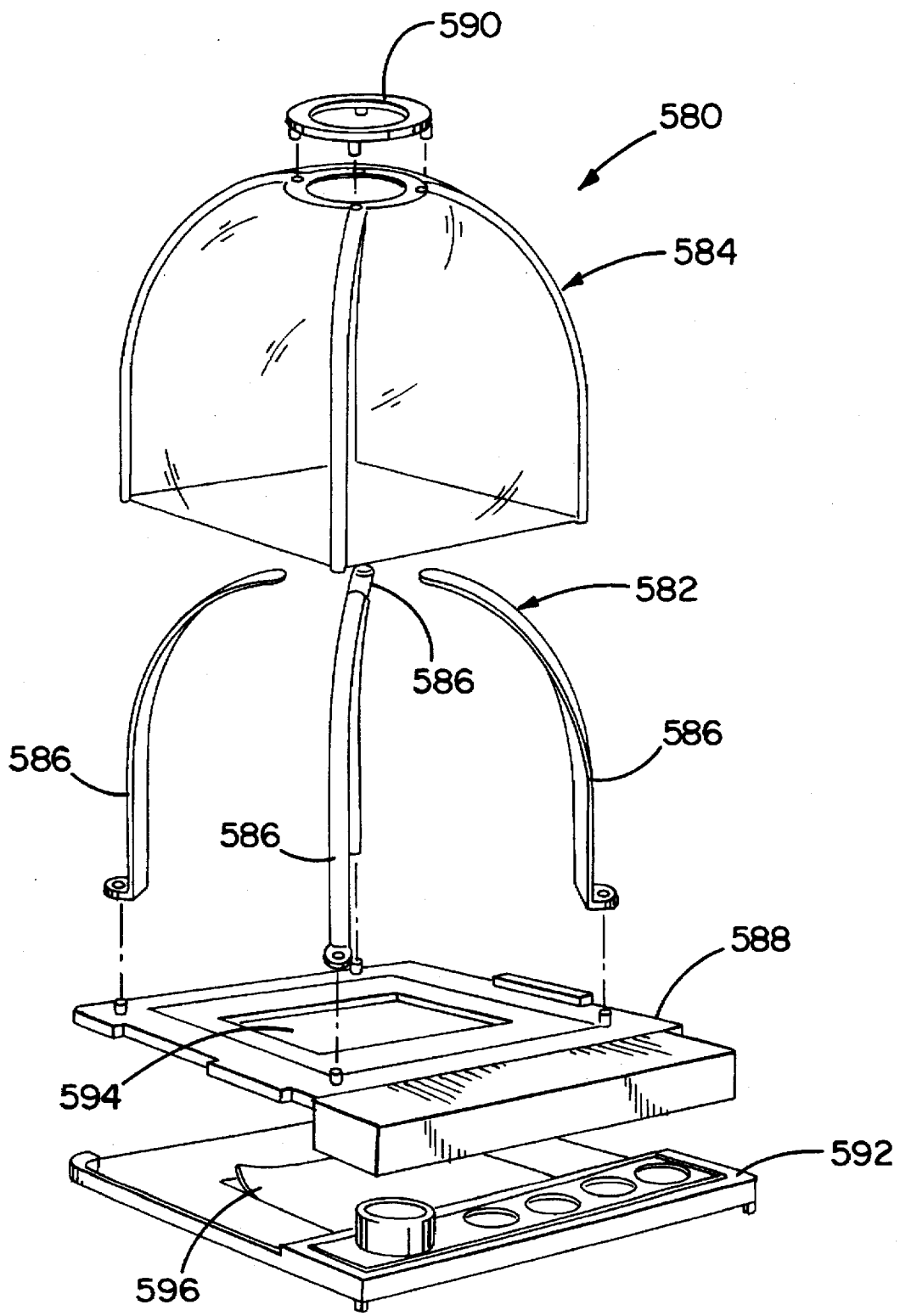
FIG. 55 is an exploded view of yet another alternative shield constructed in accordance with the teachings of the instant invention and shown with an optional tray and platform structure.

Another alternative shield constructed in accordance with the teachings of the instant invention is indicated generally in FIG. 47 by reference numeral 530. As illustrated in FIG. 48, the shield 530 is a substantially conical structure preferably including three sides 532 which can be coupled together to define a volume for containing bubbles as shown in FIG. 47. As illustrated in FIG. 49, each side 532 of the shield 530 includes oppositely disposed edges having an indent 534 and a detent 536. The detent 536 of each side 532 is received by the indent 544 of an adjacent side 532 to secure the sides 532 together as shown in FIG. 47.

Another alternative shield constructed in accordance with the teachings of the instant invention is indicated generally in FIG. 50 by reference numeral 540. As illustrated in FIG. 51, the shield 540 includes two components, a base component 542 and an upper component 544. The base component 542 is a substantially rectangular structure having four walls 543. These walls 543 can be constructed from a single sheet of plastic equipped with three living hinges to permit the sheet to fold flat for storage and transportation. As illustrated in FIG. 51, the upper portion 544 defines a channel 546 at its perimeter which receives the upper edges of the walls 543 such that the walls 543 are held in an upright position and the upper portion 544 is supported as shown in FIG. 50. The upper portion is provided with an opening 548 to provide access to the volume defined by the shield 540.

Still another alternative shield constructed in accordance with the teachings of the instant invention is indicated generally in FIG. 52 by reference numeral 550. This shield 550 comprises a frame 552 and a flexible tent 554. The frame 552 includes four legs 556 which are each coupled to an upper ring 558. This upper ring 558 defines an opening 559 to provide access to the volume defined by the shield 550. As shown in FIG. 53, the legs are frictionally held in operative engagement with the upper ring 558 by projections 562 formed on the upper ring's lower surface. As shown in FIG. 52, the flexible tent 554 includes four pockets. Each of these pockets slidably receives one of the four legs 556 to secure the tent 554 and the frame 552 together.

Yet another alternative shield constructed in accordance with the teachings of the instant invention is indicated generally in FIG. 53 by reference numeral 570. As in the previous embodiment 550, this shield 570 is provided with a flexible tent 572. However, this flexible tent 572 is further provided with a wall 574 which defines an inflatable support structure 578 as shown in FIG. 54. This inflatable support structure 578 includes a valve 576 which enables a user to inflate and deflate the shield 570. This shield 570 includes an opening 579 which provides access to the volume defined by the shield 570.

Another alternative shield constructed in accordance with the teachings of the instant invention is indicated generally in FIG. 54 by reference numeral 580. This shield 580 includes a frame 582 and a flexible tent 584 which combine to define a volume for containing bubbles. The frame 582 includes four legs 586 each of which operatively engages a platform 588 as shown in FIG. 54. The tent 584 is then positioned over the legs 586 and an upper ring 590 is secured to the frame to hold the tent 584 and frame 582 together during use. As shown in FIG. 54, the shield 580 can be optionally provided with a supply tray 592 which includes recesses for storing colorants and the like. It should be noted that in this embodiment, the platform 588 defines a rectangular opening 594 to provide access to a sheet of paper 596 or other object positioned on the supply tray 592. In one optional embodiment, the templates described above are dimensioned to be received by the rectangular opening 594. If multiple templates are used to create predetermined images having multiple colors as described in other portions of this specification, this opening 594 will facilitate the alignment of these templates.

With respect to the component parts employed in the preferred embodiment, it should be noted that the switch 36, the potentiometer 34, and the blower 24 can be any of a number of well known commercially available products which perform the above-described functions without departing from the scope or the spirit of the instant invention. In addition, although other materials might likewise be appropriate, the housing 22 and the film support structure 60 are preferably constructed from plastic using well known molding techniques.

It should further be noted that although other bubble forming solutions can be likewise employed, in the preferred embodiment the bubble forming solution comprises a product such as "Mr. Bubbles" sold by TOOTSIETOY, a division of the Strombecker Corp. which has a place of business at 600 N. Pulaski Rd, Chicago, Ill. 60624. It will be appreciated by those skilled in the art that glycerin can be added to the bubble forming solution in order to increase the solution's ability to form large bubbles. In one embodiment such a solution could include 1 fluid ounce of "Mr. Bubbles" produced by TOOTSIETOY mixed with 1 milliliter of glycerin.

Various colorant formulas are suitable for use in coloring the bubbles produced by the embodiments of the present invention. Any compatible colorant formulation may be used. One suitable colorant is prepared by combining approximately 4 milliliters of a watercolor paint such as ACADEMY™ Watercolor Paste marketed by Grumbacher of Carnbury, N.J., with about 0.5 fluid ounces of a bubble solution formed from 1 fluid ounce of MR. BUBBLES™ bubble solution marketed by Tootsietoy, a division of Strombecker Corporation, Chicago, Ill., mixed with 1 milliliter of glycerin. The gum arabic vehicle used in the Academy watercolors appears especially useful in achieving the delivery of the paint to the bubble.

Generally, good washability from fabrics and skin fugitivity is also desired in colorants useful in the present invention since the present inventions will often be used by young children. Such colorant formulations which are especially suitable generally are non-toxic and comprise water, one or more surfactants, one or more humectants, one or more dyes, and one or more preservatives.

The water used in such colorant formulations is preferably deionized water. The amount of water present in the colorant formulations suitable for use in the present invention is typically from about 30% to about 80%. The amount of water needed is in part determined by the desired viscosity of the final colorant formulation as well as the desired intensity of the final colorant formulation. The amount of water used is also a function of the amount of surfactant required in the formulation to achieve the desired fabric washability and skin fugitivity.

Colorant compositions generally are mixtures of a coloring matter dispersed or dissolved in a carrier fluid. The coloring matter, if readily dissolving in the carrier fluid, is termed a dye. Dyes are the most suitable colorants for use in the colorant formulations of the present invention. Dyes which are suitable for use in the colorant formulations useful in the present invention include FD&C Blue #1 and FD&C Blue #2 dyes marketed by Warner-Jenkinson Company, Inc. of St. Louis, Mo.; Acid Yellow 3 and Acid Yellow 73 dyes marketed by Spectra Colors Corporation of Kearny, N.J.; DUASYN™ Fluorescent Yellow dye marketed by Hoechst Celanese of Somerville, N.J.; and Changeable Blue, Palmer Fluorescent Red and Palmer Scarlet dyes marketed by Milliken and Company of Inman, S.C.

To achieve good coloring of the colorant formulations for use in the present invention, the minimum concentration of dye which will produce a workable colorant is governed by the color intensity desired, though as little as 0.1% dye may be sufficient for certain applications. The maximum workable concentration of dye is determined largely by the ability to maintain a stable composition and the depth of color desired and can vary widely depending upon the concentration of other components. The upper workable limit of dye concentration is also a function of the characteristics of the desired end product, though a practical upper limit in the colorant formulations suitable for use in the present invention is about 35% by weight.

Surfactants may function as both release agents and also as dispersing agents for other ingredients of the composition. One particular preferred commercially available surfactant contemplated herein is EMCOL DG™ surfactant, a coco betaine sold by Witco Chemicals of Houston, Tex. A second preferred commercially available surfactant is SPECTRA Washable A-X556™, a oxyalkylene polymer mixture sold by Spectra Colors Corporation of Kearny, N.J. The two preferred surfactants enhance foaming, a generally undesirable effect in most paint formulations, but highly desirable in the colorant formulations suitable for use in the present invention. The preferred surfactants also promote washability of the colorant formulations from fabrics and from skin.

The amount of surfactant which is added to the paint formulations suitable for use in the present invention is determined by the degree of washability desired coupled with the toxicity of the surfactant used. Where a surfactant is less toxic, greater amounts may be used. For instance, EMCOL DG™ may be used in amounts from about 0% to about 4.5% by weight of the total formulation. However, when EMCOL DG™ is used in amounts greater than about 0.45% by weight, toxicity levels may render the resulting paint formulation unsuitable for use by children. SPECTRA Washable A-X556™ may be used in amounts from about 0% to about 40% by weight of the total formulation. When A-X556™ is used in amounts greater than about 40% by weight, toxicity levels may render the resulting paint formulation unsuitable for use by children.

Addition of a humectant ensures that coloring compositions of the invention do not prematurely dry during their application to the bubble for use in the present invention. The humectant also strengthens the bubble formed by the present invention so that larger bubbles may be formed without the bubble bursting. Typical humectants which may be employed in the colorant formulations suitable for use in the present invention include polyhydric alcohols such as ethylene glycol, propylene glycol, hexylene glycol and poly(ethylene glycol), and hydroxylated starches. The humectant is preferably glycerin.

The humectant is generally used in an amount of from about 10% to about 20% by weight of the composition, though this range is by no means critical. The amount of humectant to be added is determined by the protection time period desired. In one preferred composition, the humectant, glycerin, is added in an amount of from about 15% to about 20% by weight of the coloring composition.

To maintain the shelf life of the colorant formulations suitable for use in the present invention, one or more preservative may be added. Preservatives preferably serve as both a bactericide and a fungicide, and are added in any effective amount, though a typical concentration range is from about 0.1% up to about 5.0% by weight. The use of preservatives in levels greater than about 5% by weight may cause the colorant formulation to become toxic or unstable and may, in any event, be unnecessary.

Any conventional preservative may be utilized in the invention as long as there is compatibility with the remaining colorant components. One preferred preservative is NUOSEPT 95™, a bicyclic oxazolidines solution marketed by Huls America, Piscataway, N.J. Two other preferred preservatives include TROYSAN POLYPHASE P-100™, a 3-Iodo-2-Propynyl Butyl Carbamate sold by Troy Chemical, and PVP K-30™, a 2-Pyrrolidinone, 1-Ethenyl-, Homopolymer sold by ISP Technologies Inc. Preferably, these two preservatives are solubilized in M-PYROL™, a 1-Methyl-Pyrrolidinone solubilizer, sold by GAF Chemicals Corporation forming a preservative premix consisting of about 2% by weight POLYPHASE P-100™, about 2% by weight PVP K-30™ by weight, and about 96% by weight M-Pyrol™. Addition of preservatives to the colorant formulations suitable for use in the present invention inhibit the growth of bacteria and fungi in the water-based formulations.

The following were prepared as examples of colorant formulations suitable for use with the present invention. Percentages are expressed as weight percent of the total formulation.

| Component | Example 1 Yellow Colorant % | Example 2 Red Colorant % |
|---|---|---|
| DI Water | 75.40 | 46.89 |
| Surfactant | | |
| EMCOL DG | 0.42 | 0.42 |
| Humectant | | |
| Glycerin | 17.47 | 15.62 |
| Dyes | | |
| Acid Yellow 73 | 0.89 | — |
| Acid Yellow 3 | 0.77 | — |
| Duasyn Yellow | 2.98 | — |
| Fluorescent Red | — | 3.90 |
| Palmer Scarlet | — | 31.23 |
| Preservatives | | |
| Preservative Premix | 1.81 | 1.69 |
| Nuosept 95 | 0.26 | 0.25 |

| Component | Example 3 Blue Colorant % | Example 4 Blue Colorant % |
|---|---|---|
| DI Water | 36.73 | 68.10 |
| Surfactant | | |
| EMCOL DG | 0.42 | 0.42 |
| Spectra A-X556 | 40.00 | — |
| Humectant | | |
| Glycerin | 16.91 | 15.83 |
| Dyes | | |
| FD&C #1 | 4.00 | — |
| FD&C #2 | — | 9.05 |
| Milliken Changeable Blue | — | 4.52 |
| Preservatives | | |
| Preservativ Premix | 1.69 | 1.81 |
| Nuosept 95 | 0.25 | 0.27 |

The preservative premix used in Examples 1–4 consists of 2% by weight POLYPHASE P-100™, 2% by weight PVP K-30™ by weight, and 96% by weight M-Pyrol™. The colorants of examples 1 through 4 had acceptable working properties and were suitable for use in the present invention. In addition, these colorant formulations exhibited excellent washability from fabrics and skin fugitivity.

Another alternative embodiment of an apparatus 210 for marking a surface with bubbles constructed in accordance with the instant invention is illustrated in FIG. 12. As in the preferred embodiment discussed above, this apparatus 210 can be employed with a shield 280 as shown in FIG. 12 or without a shield as shown in FIGS. 13–19 without departing from the scope or the spirit of the invention. However, it will be appreciated that the use of a shield is preferred to insure that the surrounding environment is not inadvertently soiled when operating the device.

Figure 20:
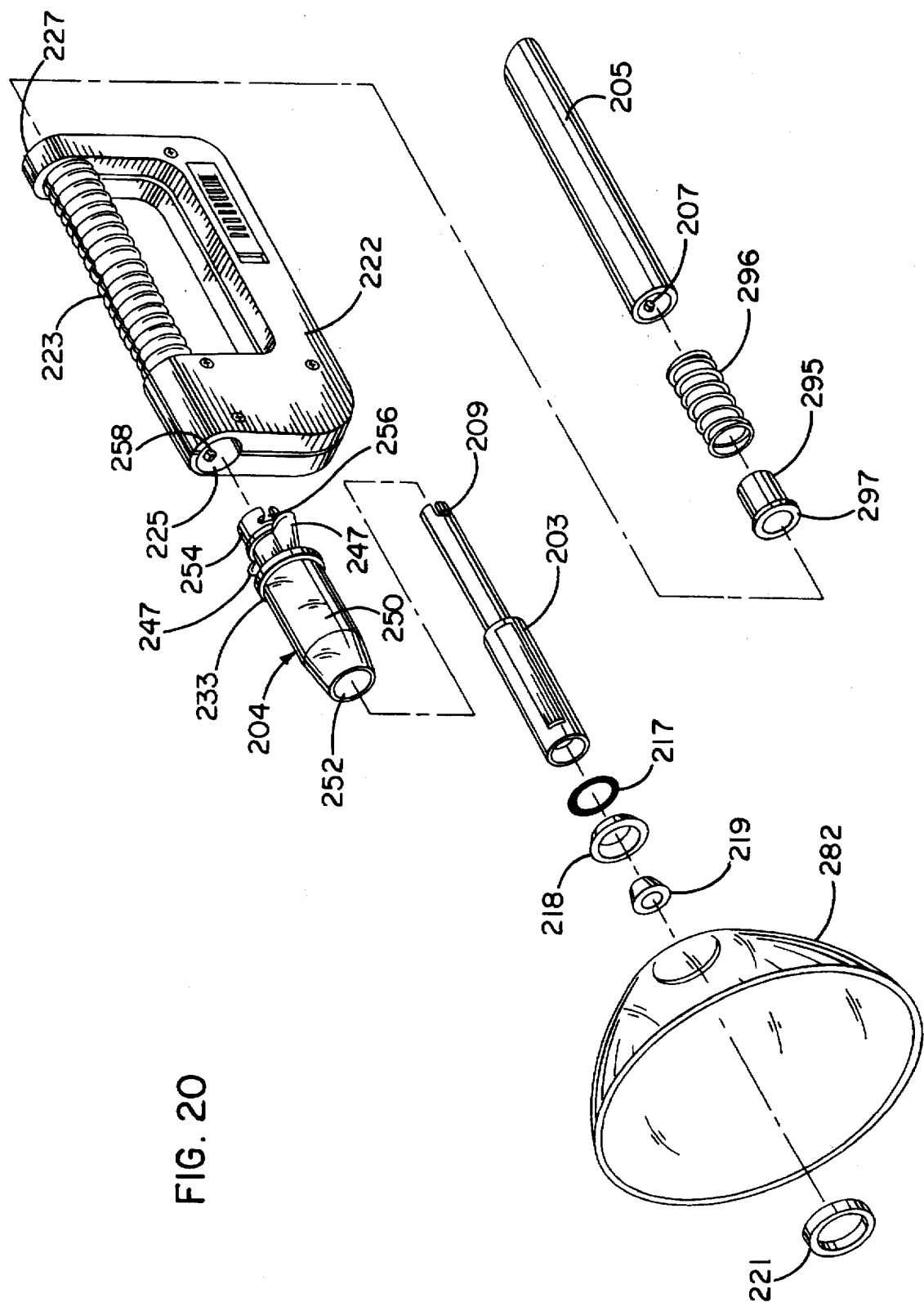
FIG. 20 is a partially exploded view of the apparatus of FIG. 12.

As illustrated in FIGS. 12 and 20, the apparatus 210 includes a bubble generating device 220 having a central flow tube 202, a housing 222, and a colorant supplying structure 204; all of which interact to generate colored bubbles. To this end, as shown in FIGS. 21–24 the housing 222 includes an electrically actuated blower 224 which can be actuated to pass a stream of air down a central flow cavity 206 and through a bubble forming opening 264, both of which are defined by the central flow tube 202. If the stream of air generated by the blower 224 is directed down the central flow tube 202 when a film of bubble forming solution is positioned across the bubble forming opening 264, the film will be formed into bubbles. One or more colorants can be applied to the bubbles formed in this manner through the colorant supplying structure 204 as described in detail below to form colorant carrying bubbles for marking a surface.

Figure 16:
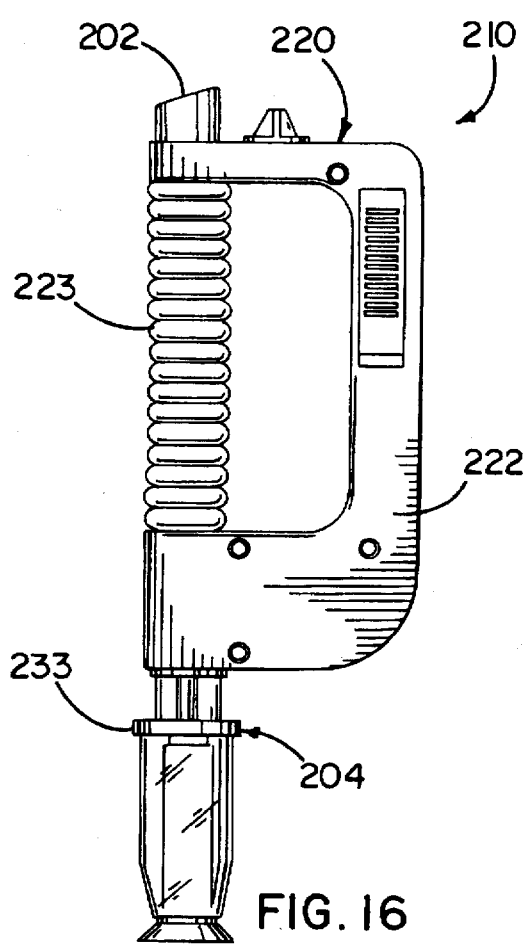
FIG. 16 is a right side elevational view of the of the apparatus of FIG. 13.
Figure 17:
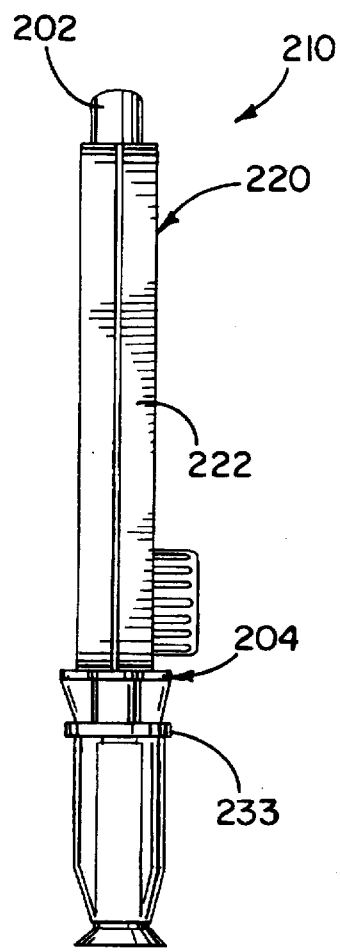
FIG. 17 is a rear elevational view of the apparatus of FIG. 13.

As shown in FIGS. 13 and 16, the housing 222 is preferably a rectangular structure which can be easily gripped by a user. To this end, a portion of the housing 222 preferably includes a plurality of rings or bumps which combine to form a slip resistant handle 223. As shown in FIG. 20, the housing 222 defines two openings 225, 227 disposed in substantial alignment at opposite ends of this handle 223. These openings 225, 227 are dimensioned to slidably receive the central flow tube 202 such that the central flow tube 202 passes completely through the handle 223 and extends from both ends of the housing 222 as illustrated in FIGS. 12–17.

Figure 21:
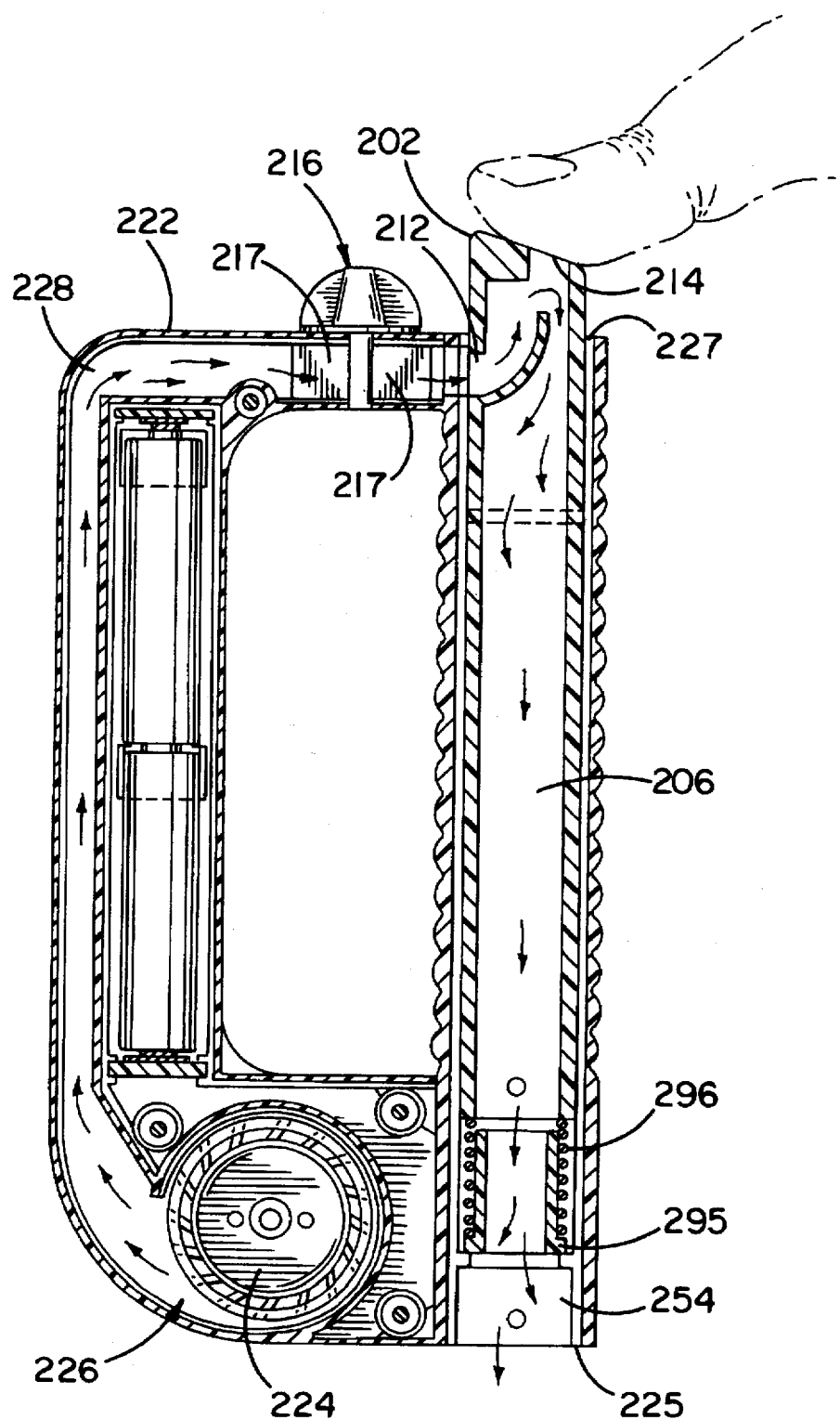
FIG. 21 is a partial cross-sectional view of the apparatus of FIG. 13 taken along lines 21—21 of FIG. 14.
Figure 22:
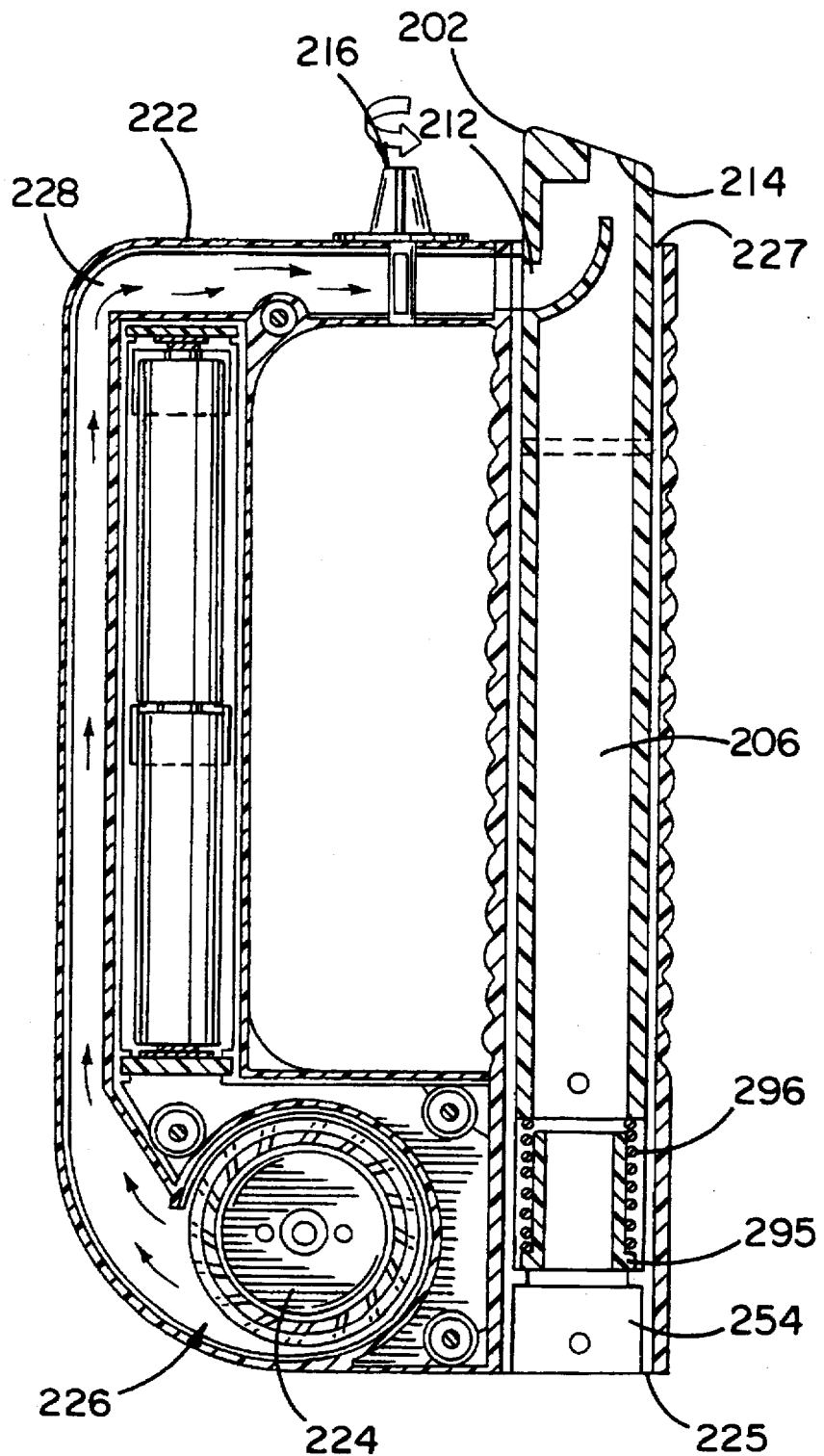
FIG. 22 is a view similar to FIG. 21 but showing a valve of the apparatus positioned in a closed position to prevent air flow.

As mentioned above, the housing 222 contains an electrically actuated blower 224 which draws air from the external environment through vents 229 and propels that air through the housing 222 to form bubbles. As illustrated in FIGS. 21 and 22, this blower 224 is positioned within an internal cavity 226 defined by the housing 222 which serves to funnel the air blown by the blower 224 into a stream by directing it through an air flow channel 228 in a manner similar to the preferred embodiment. However, unlike the air flow channel 28 of the preferred embodiment, this air flow channel 228 does not communicate directly with the exterior environment. Instead, the air flow channel 228 communicates with an air flow port 212 formed in the side of the central flow tube 202 as illustrated in FIGS. 21 and 22.

Figure 18:
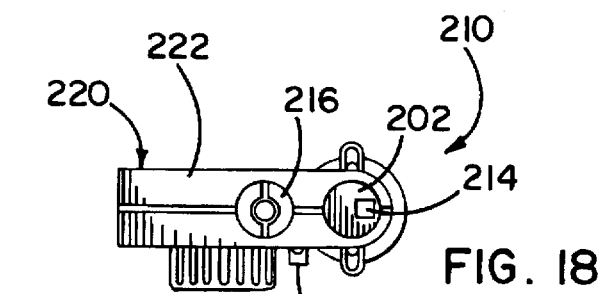
FIG. 18 is a top plan view of the apparatus of FIG. 13.
Figure 19:
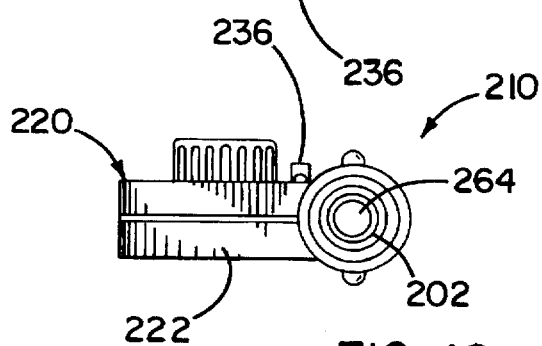
FIG. 19 is a bottom plan view of the apparatus of FIG. 13.

To this end, the central flow tube 202, which is a substantially cylindrical structure, defines a central flow cavity 206 which receives the stream of air generated by the blower 224 through the air flow port 212 as shown in FIGS. 21 and 22. This central flow cavity 206 communicates with two openings defined by opposite ends of the central flow tube 202. One of these openings, which is positioned on the bottom of the central flow tube 202 as illustrated in FIG. 19, is the circular bubble forming opening 264 which supports a film of bubble forming solution in the path of the air stream to form bubbles as described above. The other is the exhaust port 214 which is positioned in the top of the central flow tube 202 as shown in FIGS. 14, 15 and 18 to exhaust the stream of air to the environment.

This later purpose is facilitated by a deflection wall 208 disposed within the central flow cavity 206. As shown in FIG. 21, this deflection wall 208 deflects the air stream flowing from the air flow port 212 upwards towards the exhaust port 214. Thus, unless the exhaust port 214 is obstructed, the air stream will pass from the central flow cavity 206 to the external environment through the exhaust port 214 rather than passing through the bubble forming opening 264. Thus, if a user wishes to form bubbles with the device 20, the user must obstruct the exhaust port 214 with their thumb or some other object such that the air stream is deflected downwards through the central flow cavity 206 and out through the bubble forming opening 264 as illustrated in FIG. 21.

The bubble forming end of the central flow tube 202 preferably includes an upper ring 218 and an inner ring 219 as illustrated in FIGS. 20, 23, and 24. The upper ring 218 preferably has a substantially conical shape for interacting with the colorant supplying structure 204 as explained in detail below. The inner ring 219 forms the bubble forming opening 264.

It should be noted that the central flow tube 202 preferably comprises two components 203, 205 as illustrated in FIG. 20. The upper component 205 is provided with a projection 207 which mates with a slot 209 formed in the lower component 203 to operatively engage the two components 203, 205 as shown in FIG. 23. This arrangement facilitates assembly and disassembly for cleaning and the like.

In order to control the operation of the blower 224, the housing 222 is provided with an electrical circuit which is substantially identical to the circuit 32 of the preferred embodiment. However, in this embodiment the circuit does not include a potentiometer 34. Consequently, in contrast to the preferred embodiment, the speed of the blower 224 of this embodiment cannot be controlled by the user. Instead, the blower 224 can only be toggled between an "on" state and a "off" state by manipulating a switch.

In order to provide the user with control over the amount of air provided to the internal cavity 206 of the central flow tube 202, the housing 222 is further provide with a valve 216 as illustrated in FIGS. 21 and 22. Preferably, this valve 216 is a manually engageable mechanical valve which includes movable wings 217 disposed in the air flow channel 228. By rotating the valve 216, a user can position these wings 217 at different angles with respect to the air flow channel 228 to allow different amounts of air to pass into the central flow cavity 206. The valve 216 is illustrated in the completely open position in FIG. 21 and in the completely closed position in FIG. 22. Those skilled in the art will, of course, appreciate that other positions intermediate to those shown in FIGS. 21 and 22 can be employed to achieve different flow results.

In order to selectively apply one or more colorants to the bubbles generated at the bubble forming opening 264, the apparatus 10 is provided with a colorant supplying structure 204. As illustrated in FIGS. 23 and 24, this colorant supplying structure 204 is a substantially cylindrical structure including a first wall 250. This first wall defines a central cavity 252 for receiving the central flow tube 202. To this end, the colorant supplying structure 204 includes a substantially circular upper portion 254 for coupling the colorant supplying structure 204 to the housing 222. Specifically, the upper portion 254 is slightly smaller than the opening 225 of the housing 222 and, thus, can be inserted therein. As shown in FIG. 24, the upper portion 254 includes a pair of oppositely disposed slots 256 which mate with projections 258 disposed on the inner surface of the housing 222. The interaction of these slots 256 and projections 258 serves to operatively couple the colorant supplying structure 204 to the housing 222.

As illustrated in FIGS. 23 and 24, the colorant supplying structure 204 is coupled to the housing 222 such that the central cavity 252 aligns with the openings 225, 227 in the housing 222. Thus, the central cavity 252 of the colorant supplying structure 204 is positioned to receive the central flow tube 202 as shown in FIGS. 23 and 24. In this embodiment, the outer surface of the lower portion 203 of the central flow tube 202 and the inner surface of the colorant supplying structure's first wall 250 define an annular colorant storage cavity 246. As shown in FIGS. 23 and 24, this annular colorant storage cavity 246 communicates with two colorant ports 247. These colorant ports 247 enable a user to insert colorants into the colorant storage cavity 246 to form colored bubbles as explained below.

The colorants are inserted into the colorant storage cavity 246 through the colorant ports 247. In order to prevent the colorants from immediately flowing out of the opposite end of the cavity 246, the apparatus 210 is further provided with an O-ring 217 disposed between the substantially conical upper ring 218 and the bottom of the first wall 250. The apparatus 210 is further provided with a spring 296 disposed between an annular ledge 297 on a spring cap 295 and an annular projection 298 on the central flow tube 202 as illustrated in FIGS. 20, 23, and 24. As shown in FIGS. 21 and 22, the spring cap 295 abuts a portion of the housing 222. Thus, the spring 296 biases the central flow tube 202 upwards relative to the colorant supplying structure 204 such that the O-ring 217 is held snugly between the substantially conical ring 218 and the bottom of the first wall 250. In this way, the O-ring seals the annular colorant storage cavity 246.

As mentioned above, the central flow tube 202 is slidable relative to the housing 222 and the colorant supplying structure 204. A user can, thus, break the seal formed between the O-ring 217 and the annular storage cavity 246 by depressing the central flow tube 202 downwards against the force of spring 296 to selectively release the colorants stored in the cavity 246.

In use, a user first dips the bubble forming end of the central flow tube 202 into bubble forming solution such that a film of bubble forming solution forms over the bubble forming opening 264. The user then closes the switch 236 to energize the blower 224. By adjusting the valve 216 and putting their thumb or some other object over the exhaust port 214, the user can then direct a stream of air through the central flow tube 206 to form a bubble at the bubble forming opening 264. After the user inserts one or more colorants into the colorant storage cavity 246 through the colorant ports 247, the user can release the colorants onto the surface of the bubble by depressing the central flow tube 202. The colored bubble will then detach from the apparatus 210 and burst in the proximity of the surface to form a design.

As illustrated in FIG. 12, the apparatus 210 includes an attached shield 280 to confine the colored bubbles and thereby minimize soiling of the surrounding environment. In this embodiment, the shield 280 is secured to the colorant supplying structure 204 between an attachment ring 221 and a circular ridge 233 on the colorant supplying structure 204 as shown in FIGS. 12 and 20. To this end, the shield 280 includes a substantially circular opening which receives a portion of the colorant supplying structure 204 and the attachment ring 221 frictionally engages the colorant supplying structure 204 to hold the shield 280 in position during use. It will be appreciated by those skilled in the art, however, that the apparatus 210 can be employed without a shield or with a free standing shield such as those illustrated in FIGS. 1 and 35 without departing from the scope or the spirit of the instant invention. It will further be appreciated that although in this embodiment the attachment ring 221 is attached to the colorant supplying structure 204 through a frictional engagement such that the shield 280 is removable, the attachment ring 221 could be permanently attached to the colorant supplying structure 204 by glue or other securing means without departing from the scope or the spirit of the invention.

Figure 25:
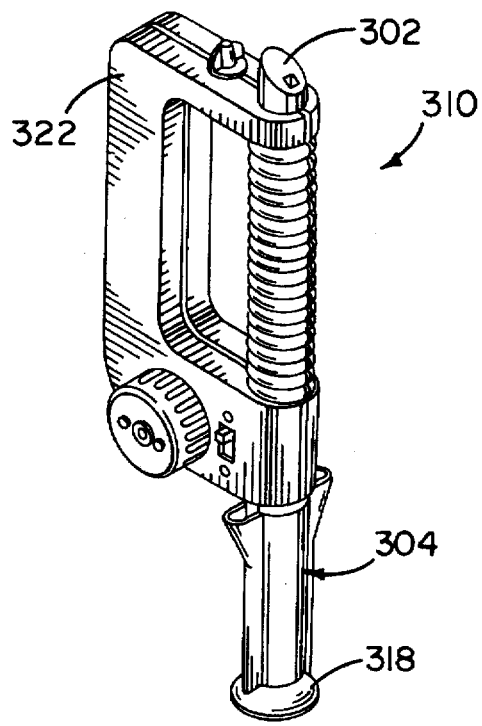
FIG. 25 is a left, front perspective view of still another alternative embodiment of the apparatus.

Another example of an apparatus 310 constructed in accordance with the teachings of the instant invention for marking a surface with bubbles is illustrated in FIG. 25. This embodiment 310 is substantially similar to the previously described embodiment 210 illustrated in FIGS. 12–24. Thus, it includes a housing 322, a central flow tube 302, and a colorant supplying structure 304 all of which cooperate in substantially the same way as the corresponding structures in the previously described embodiment 210. In view of these substantial similarities, the following description will, in the interest of brevity, focus upon the structures of this embodiment 310 which are different from the previously described embodiment 210, namely, the central flow tube 302 and the colorant supplying structure 304. The interested reader is referred to the above discussion of embodiment 210 for a fuller explanation of the operation of the instant apparatus 310 and a description of the structures which are not repeated here.

Figure 29:
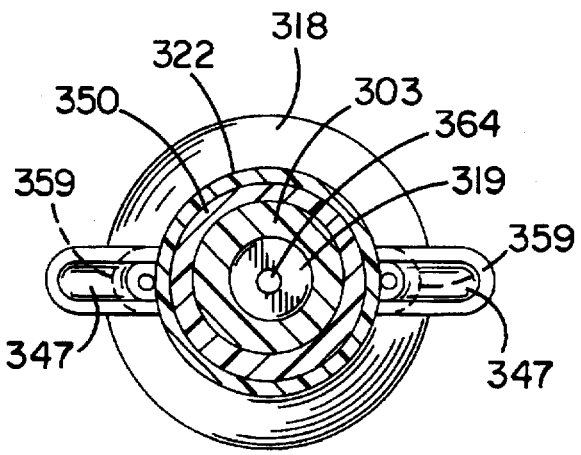
FIG. 29 is a cross-sectional view of the colorant supplying structure of the apparatus taken along lines 29—29 of FIG. 27.
Figure 30:
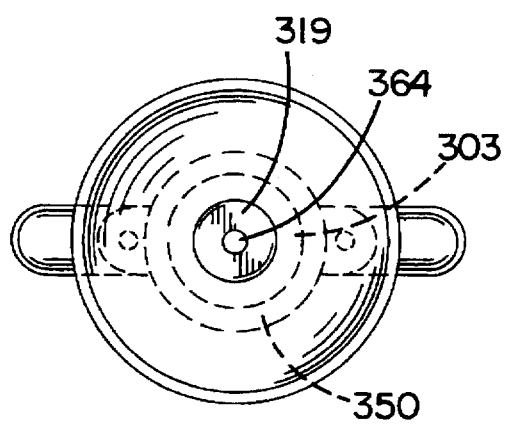
FIG. 30 is a bottom plan view of the apparatus taken along lines 30—30 of FIG. 27.
Figure 31:
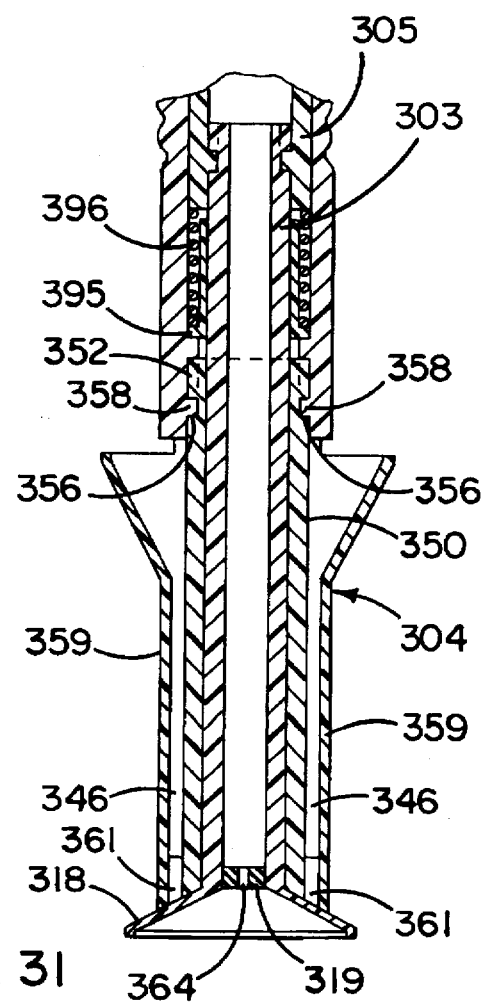
FIG. 31 is an enlarged, cross-sectional view of the apparatus taken along lines 31—31 of FIG. 26.

The primary differences between this embodiment 310 and the previously described embodiment 210 are found in the central flow tube 302 and the colorant supplying structures 304. Specifically, the central flow tube 302 of this apparatus 310 is different from the central flow tube 202 in the previous embodiment in that it does not include a lower ring 221. As shown in FIGS. 29, 30 and 31, it is also different in that it includes an integral, substantially conical, upper ring 318 and its inner ring 319 defines a smaller bubble forming opening 364 than the previous embodiment 210.

As illustrated in FIG. 31, the colorant supplying structure 304 includes a first wall 350 which defines a central cavity for receiving the lower component 303 of the central flow tube 302. As in the previous embodiment 210, this first wall 350 forms an upper portion 354 for coupling the colorant supplying structure 304 to the housing 302. This coupling is effected via a slot and protrusion arrangement. Specifically, the upper portion 354 includes a pair of oppositely disposed slots 356 which mate with projections 358 disposed on the inner surface of the housing 322.

As illustrated in FIG. 31, this embodiment 310 of the invention includes two additional walls 359 each of which combines with the first wall 350 to form a colorant storage cavity 346. Each of these colorant storage cavities 346 communicate with a colorant port 347 as shown in FIG. 29. These colorant ports 347 enable a user to insert one or more colorants into the colorant storage cavities 346 for selectively forming colored bubbles.

Figure 26:
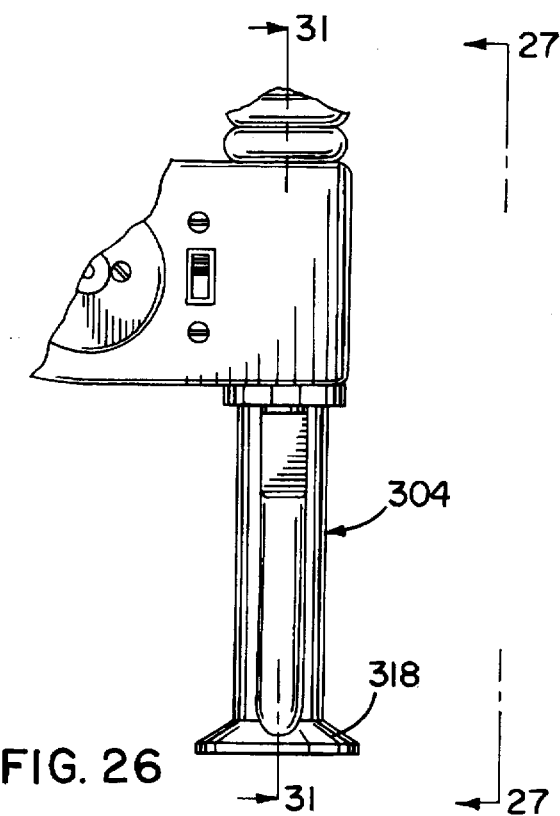
FIG. 26 is an enlarged, left side elevational view of the colorant supplying structure of the apparatus illustrated in FIG. 25.
Figure 27:
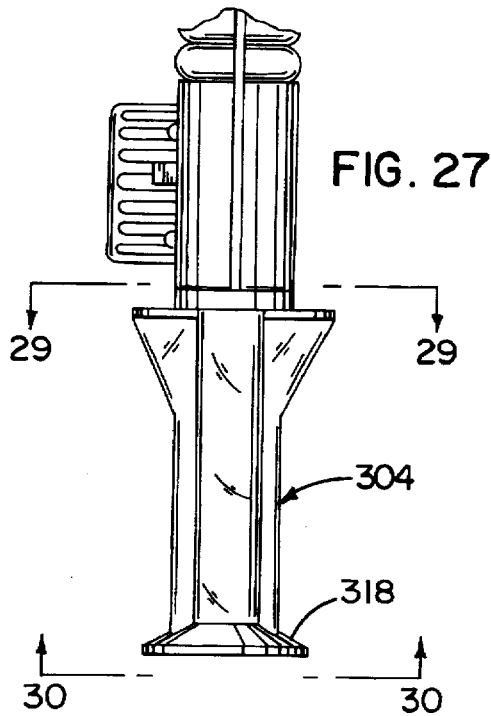
FIG. 27 is a front elevational view of the colorant supplying structure of the apparatus taken along lines 27—27 of FIG. 26.
Figure 28:
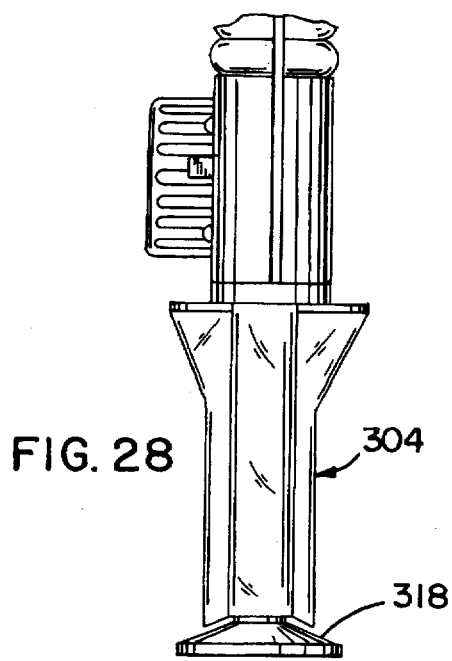
FIG. 28 is a view similar to FIG. 27 but illustrating the apparatus in the colorant release position.

The colorant storage cavities 346 each include a discharge port 361 for discharging the stored colorants as shown in FIG. 31. These discharge ports 361 abut a rubber sealing ring disposed near the upper surface of the substantially conical ring 318 to prevent the colorants from inadvertently leaking out of the colorant storage cavities 346 as shown in FIGS. 26, 27, and 31. As in the previous embodiment 210, this apparatus 310 includes a spring 396 and a spring cap 395 which bias the upper component 305 of the central flow tube 302 upwards relative to the colorant supplying structure 304 to form a seal between the rubber sealing ring and the colorant supplying structure 304 as shown in FIG. 31. As illustrated in FIG. 28, this spring bias can be overcome by applying a downward force upon the central flow tube 302 to break the seal between the rubber sealing ring and the colorant supplying structure 304 thereby permitting the colorants stored in the colorant storage cavities 346 to flow from the discharge ports 361.

Figure 37:
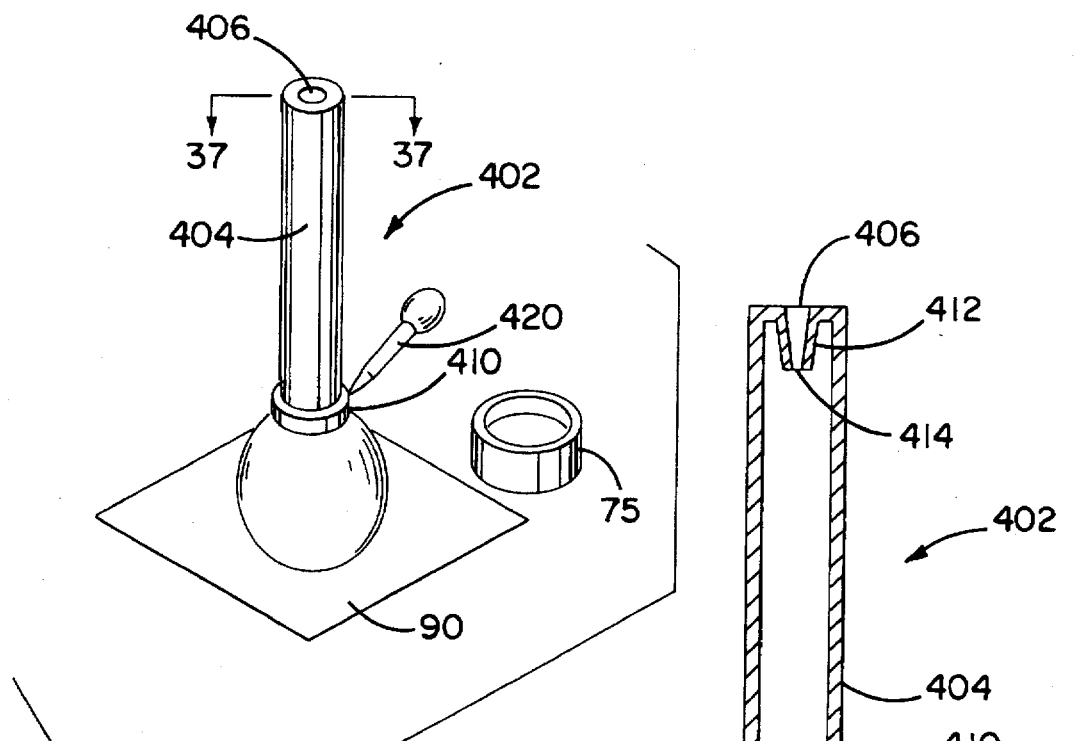
FIG. 37 is a perspective view of another alternative embodiment.
Figure 38:
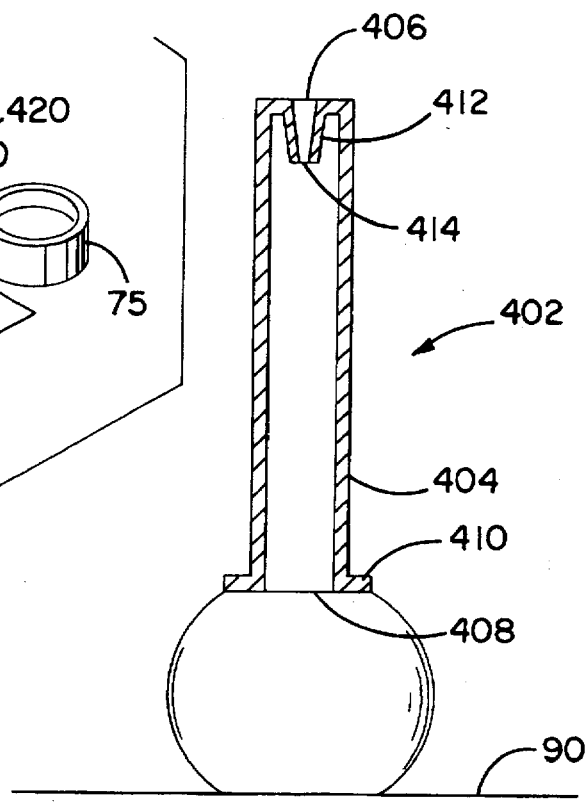
FIG. 38 is a cross-sectional view of the apparatus of FIG. 37 taken along lines 38—38 of FIG. 37.

Another embodiment of the apparatus is indicated generally by reference numeral 402 in FIGS. 37 and 38. The apparatus 402 includes a tube 404 which as an upper opening 406 and a lower opening 408. The lower end of the apparatus may include an optional rim 410. The rim 410 may include ridges. The apparatus may include a restrictor or valve to limit the flow of air. In this embodiment, the restrictor 412 is located at the upper end of the tube 404. However, the restrictor or valve could be positioned in other locations. In this embodiment, the restrictor reduced the diameter of the tube 404. In addition, the apparatus may be used with or without a shield.

The tube 404 is preferably made of plastic and has an inside diameter of about one-half inch. The restrictor 412 reduces the inside diameter of the opening 414 to about one-eighth inch. The rim 410 extends approximately one-eighth inch from the outside diameter of the tube 404.

When a user wishes to use the apparatus 402, the user dips the lower end of the apparatus into a container 75 which contains a bubble forming solution. A film will form in the opening 408. The user then uses an applicator, such as, eye dropper 420, to apply one or more colorants to the lower end of the tube 404 or the rim 410. The user then blows into the upper end of the tube 404 to generate a stream of air. The stream of air will pass through the opening 408 to displace the film and form a colored bubble. This colored bubble is then applied to a surface 90 which results in the colorants being applied to the surface 90. Of course, the colorant could be applied to the bubble and/or the tube 404 or rim 410 either before generating a bubble, while the bubble is being formed, or after the bubble is formed, as noted earlier. In addition, the colorant could be mixed with the bubble forming solution. Furthermore, the apparatus could be used with or without a shield.

Figure 39:
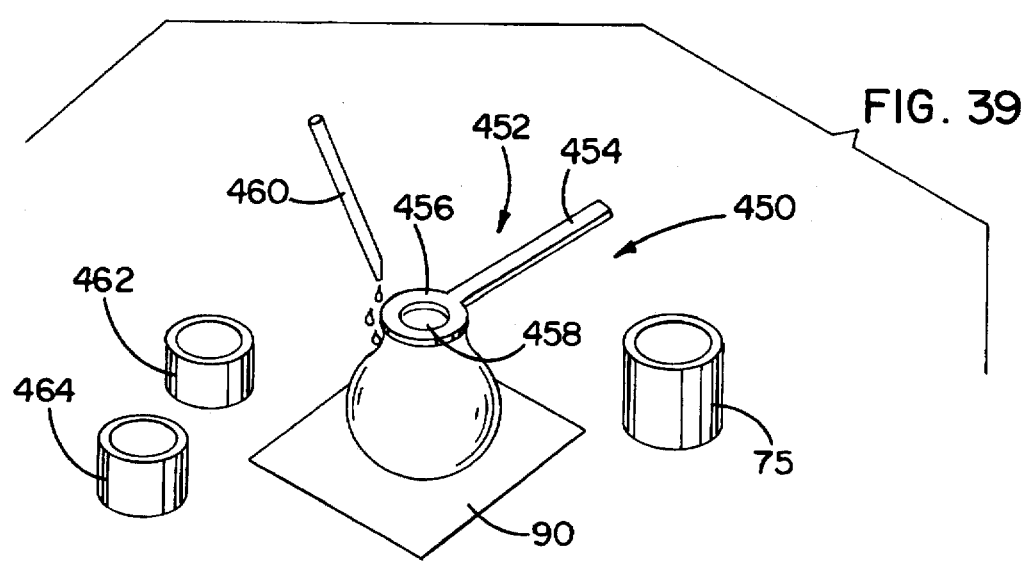
FIG. 39 is a perspective view of another alternative embodiment.

An additional embodiment of the apparatus is indicated generally by reference numeral 450 in FIG. 39. The apparatus 450 includes a wand 452 which has a handle 454 at the proximal end and a film supporting structure 456 at the distal end. The film supporting structure has an opening 458 and may include ridges.

When a user wishes to use the apparatus 452, the user dips the distal end into a container 75 which contains a bubble forming solution. A film will form in the opening 458. The user then uses an applicator, such as, elongated rod 460, to apply one or more colorants from the containers 462, 464 to the distal end and preferably the film supporting structure 456. The user then blows into the opening 458 to generate a stream of air. The stream of air will displace the film and form a colored bubble. The colored bubble is then applied to a surface 90. Of course, our methods as described could be used.

It should be noted that any of the above described embodiments can be packaged in a kit. Such a kit would preferably include a bubble generating device, a shield, a vinyl drop cloth, a cup for water, a cup for bubble solution, a vacuum formed tray, a can of bubble solution, three bottles of colorant solution (each containing a different color), and several 8½ by 11 inch sheets of paper.

While particular embodiments of the invention have been shown, it will be understood, of course, that the invention is not limited thereto. On the contrary, we intend to cover all alternatives, modifications and equivalents as may be included within the scope and spirit of the invention as defined in the appended claims

What is claimed is:

1. An apparatus for creating a design on a surface comprising:

a supply of bubble forming solution;

a film supporting structure to support a film of the bubble forming solution from the supply of bubble forming solution;

a housing coupled to the film supporting structure and including an air flow opening, the film supporting structure comprising a ring and at least one support arm positioned between the housing and the ring to separate the ring a distance from the housing;

a blower positioned within the housing to blow air through the air flow opening to displace the film supported by the film supporting structure such that at least a portion of the film forms a bubble; and, at least one coloring material coupled to the film such that, when the at least one portion of the film forms a bubble and the bubble bursts, the bubble transfers the at least one coloring material to the surface.

2. An apparatus as defined in claim 1 wherein the housing includes an air flow channel communicating with the air flow opening for directing the air blown by the blower in a predetermined direction.

3. An apparatus as defined in claim 1 wherein the film supporting structure defines an opening and supports the film at least partially over the opening.

4. An apparatus as defined in claim 3 wherein the air flow opening is substantially parallel to the opening in the film supporting structure.

5. An apparatus as defined in claim 1 wherein the ring includes radially disposed surface ridges and defines an opening, the ring supporting at least a portion of the film across the opening.

6. An apparatus as defined in claim 1 further comprising a power source operatively connected to the blower for energizing the blower.

7. An apparatus as defined in claim 6 further comprising a manually engageable electrical switch operatively connected to the power source for selectively coupling the power source to the blower.

8. An apparatus as defined in claim 6 further comprising means for selectively controlling the speed of the blower.

9. An apparatus as defined in claim 8 wherein the means for selectively controlling the speed of the blower comprises a potentiometer connected in series with the power source and the blower.

10. An apparatus as defined in claim 1 further comprising a shield for receiving at least a portion of the film supporting structure, the shield defining a volume for confining the bubble.

11. An apparatus as defined in claim 10 wherein the shield includes a first aperture for introducing the bubble into the volume and a second aperture exposing the surface to the bubble.

12. An apparatus as defined in claim 10 wherein the shield is coupled to the housing.

13. An apparatus as defined in claim 1 further comprising a template for positioning on the surface in the proximity of the air flow opening of the housing, the template including at least one aperture for providing access to a predetermined portion of the surface such that the at least one coloring material transferred by the bubble creates a predetermined shape on the surface corresponding to the at least one aperture when the bubble bursts.

14. An apparatus as defined in claim 1 further comprising a colorant supplying structure for operatively engaging at least one of the group consisting of: the bubble forming solution, the film, the film supporting structure, and the bubble.

15. An apparatus as defined in claim 14 wherein the colorant supplying structure comprises an applicator for applying the at least one coloring material to at least one of the group consisting of: the bubble forming solution, the film, the film supporting structure, and the bubble.

16. An apparatus as defined in claim 15 wherein the applicator comprises one or more bottles containing the at least one coloring material.

17. An apparatus as defined in claim 15 wherein the applicator comprises a container containing the bubble forming solution and the at least one coloring material.

18. An apparatus for marking a surface comprising, in combination:
a bubble generating device for blowing a bubble; and,
a shield defining a volume for confining the bubble generated by the bubble generating device, the shield including a first and a second opening, the first opening being dimensioned to receive at least a portion of the bubble generating device to permit introduction of the bubble into the volume, and the second opening being dimensioned to expose a surface to the bubble generated by the bubble generating device;
wherein the bubble generating device comprises:
a housing defining a third opening;
a blower positioned within the housing for blowing a stream of air through the third opening; and,
a solution support structure coupled to the housing and including a ring for supporting a solution of bubble forming material, the ring defining a fourth opening in substantial alignment with the third opening for positioning at least a portion of the solution of bubble forming material in the stream of air blowing out of the housing through the third opening to form the bubble.

19. The apparatus of claim 18 further comprising at least one colorant applied to at least one of the group consisting of: the solution support structure, the ring, the solution of bubble forming material, and the bubble.

20. The apparatus of claim 18 further comprising at least one colorant applied to at least one of the group consisting of: the solution support structure, the ring, the solution of bubble forming material, and the bubble.

21. The apparatus of claim 18 wherein the third and fourth openings are substantially circular.

22. The apparatus of claim 18 wherein the solution support structure includes at least one support arm positioned between the housing and the ring to separate the ring a distance from the housing.

23. The apparatus of claim 18 wherein the ring includes radially disposed surface ridges.

24. The apparatus of claim 18 further comprising an electrical circuit disposed within the housing for energizing the blower.

25. The apparatus of claim 24 wherein the electrical circuit comprises a power source and a manually engageable electrical switch for selectively coupling the power source to the blower.

26. The apparatus of claim 25 wherein the electrical circuit further comprises means for selectively controlling the speed of the blower.

27. The apparatus of claim 26 wherein the means for selectively controlling the speed of the blower comprises a potentiometer connected in series with the power source and the blower.

28. The apparatus of claim 18 wherein the shield is substantially conical.

29. The apparatus of claim 18 wherein the shield is substantially hemispherical.

30. The apparatus of claim 18 wherein the shield includes a base for supporting the surface to be marked, and a substantially vertical wall, the substantially vertical wall defining the first and second openings.

31. The apparatus of claim 18 wherein the first opening is dimensioned to receive the bubble generating device including at least the solution support structure thereof.

32. The apparatus of claim 18 wherein the shield is coupled to the bubble generating device.

33. An apparatus for marking a surface comprising:
a central flow tube defining a central flow cavity and having a first end and a second end, the first end including a first port in communication with the central flow cavity for receiving bubble forming solution, the second end defining a bubble forming opening in communication with the central flow cavity, the central flow cavity including a second port;
a housing defining first and second openings disposed in substantial alignment for slidably receiving the central flow tube such that the first end of the central flow tube extends beyond the first opening of the housing and the second end of the central flow tube extends beyond the second opening of the housing, the housing including a blower positioned for blowing a stream of air through the second port into the central flow cavity and through the bubble forming opening to form the bubble forming solution into a bubble;
a colorant supplying structure coupled to the housing, the colorant supplying structure including a colorant storage cavity and further including at least one colorant port communicating with the colorant storage cavity for receiving and selectively applying a colorant to the bubble formed at the second end of the central flow tube to thereby form a colored bubble; and,
a spring operatively engaging the central flow tube to bias the second end of the central flow tube against the colorant supplying structure to form a seal therebetween.

34. An apparatus as defined in claim 33 wherein the second end of the central flow tube is substantially conical.

35. An apparatus as defined in claim 33 further comprising means for breaking the seal between the second end of the central flow tube and the colorant supplying structure to discharge the colorant from the colorant storage cavity onto the bubble formed at the second end of the central flow tube.

36. An apparatus as defined in claim 33 wherein the housing is substantially rectangular to form a handle.

37. An apparatus as defined in claim 33 wherein the blower is coupled to the second port by an air flow channel.

38. An apparatus as defined in claim 37 further comprising a valve positioned within the air flow channel for controlling the stream of air generated by the blower.

39. An apparatus as defined in claim 33 wherein the colorant storage cavity is annular and is defined by an interior surface of a first wall of the colorant supplying structure and an outer surface of the central flow tube.

40. An apparatus as defined in claim 39 further comprising an o-ring positioned between the colorant supplying structure and the second end of the central flow tube to form a seal therebetween.

41. An apparatus as defined in claim 33 wherein the colorant storage cavity is cylindrical in shape and is defined by a second wall, the colorant storage cavity including a discharge port which is sealed by engagement with the second end of the central flow tube.

42. An apparatus as defined in claim 33 further comprising an electrical circuit disposed within the housing for energizing the blower.

43. An apparatus as defined in claim 42 wherein the electrical circuit comprises a power source.

44. An apparatus as defined in claim 43 wherein the electrical circuit further comprises a manually engageable electrical switch for selectively coupling the power source to the blower.

45. An apparatus as defined in claim 42 wherein the electrical circuit further comprises means for selectively controlling the speed of the blower.

46. An apparatus as defined in claim 45 wherein the means for selectively controlling the speed of the blower comprises a potentiometer connected in series with the power source and the blower.

47. An apparatus as defined in claim 33 further comprising a shield for receiving at least a portion of the central flow tube, the shield defining a volume for confining the colored bubble.

48. An apparatus as defined in claim 47 wherein the shield includes a first aperture for introducing the colored bubble into the volume and a second aperture exposing the surface to the colored bubble.

49. An apparatus as defined in claim 47 wherein the shield is coupled to the housing.

50. An apparatus as defined in claim 33 further comprising a template for positioning on the surface in proximity to the bubble forming opening of the central flow tube, the template including at least one aperture for providing access to a predetermined portion of the surface such that the colored bubble creates a predetermined shape on the surface corresponding to the at least one aperture.

51. An apparatus for marking a surface comprising:
a housing including a first opening and including an internal cavity in communication with the first opening;
a blower positioned within the housing in communication with the internal cavity for blowing a stream of air through the internal cavity and the first opening;
a solution support structure coupled to the housing and including a ring for supporting a solution of bubble forming material, the ring defining a second opening in substantial alignment with the first opening for positioning at least a portion of the solution of bubble forming material in the stream of air to form a bubble; and,
an applicator to apply one or more colorants to the solution of bubble forming material to thereby form a colored bubble.

52. An apparatus as defined in claim 51 wherein the applicator comprises a bottle containing one or more colorants.

53. An apparatus as defined in claim 51 wherein the applicator comprises a container containing the one or more colorants and defining a first opening, the first opening being dimensioned to receive at least a portion of the solution support structure.

54. A method for creating a design on a surface comprising the steps of:
mixing at least one coloring material with a bubble making solution to form a coloring fluid;
applying the coloring fluid to a ring defining an opening such that the coloring fluid forms a coloring film substantially covering the opening;
placing the ring in the proximity of a surface;
forcing air through the opening to form at least a portion of the coloring film into at least one coloring bubble; and,
applying the at least one coloring bubble to the surface to transfer the at least one coloring material thereto.

55. A method for creating a design on a surface comprising the steps of:
applying a bubble making solution to a ring defining an opening such that the bubble making solution forms a film substantially covering the opening;
placing the ring in the proximity of a surface;
forcing air through the opening to form at least a portion of the film into at least one bubble;
applying at least one colorant to one of the group consisting of: the ring, the film, and the bubble to form at least one colored bubble; and,
bursting the at least one colored bubble in the proximity of the surface to be marked to transfer the at least one colorant to the surface to form a design.

56. The method of claim 55 wherein the at least one colorant is applied to the film while it is being formed into the at least one bubble.

57. The method of claim 55 wherein the at least one colorant is applied to the at least one bubble after it is formed.

58. The method of claim 55 wherein the at least one colorant is applied to the film before the at least one bubble is formed.

59. A kit for marking a surface with colored bubbles comprising:
bubble forming solution;
a bubble generating device for forming the bubble forming solution into a bubble;
a shield for positioning on the surface to be marked to confine the bubble generated by the bubble generating device to a predetermined volume, the shield having a first opening to receive at least a portion of the bubble generating device and a second opening to expose the volume to the surface to be marked; and,
at least one colorant which can be transferred to a surface by the bubble formed by the bubble generating device.

60. A kit as defined in claim 59 further comprising a drop cloth for protecting the area of use from inadvertent soiling.

61. A kit as defined in claim 59 further comprising a tray for holding at least one of the group consisting of: the bubble generating device, the shield, and the at least one colorant.

62. A kit as defined in claim 59 further comprising at least one cup for holding the bubble forming solution.

63. A kit as defined in claim 59 further comprising at least one sheet of paper to form the surface that receives the at least one colorant from the bubble generated by the bubble generating device.

* * * * *